(12) United States Patent
Michonski

(10) Patent No.: US 11,433,840 B2
(45) Date of Patent: Sep. 6, 2022

(54) HEAD AND NECK SUPPORT AND PROTECTION DEVICE

(71) Applicant: Michal Michonski, Zary (PL)

(72) Inventor: Michal Michonski, Zary (PL)

( * ) Notice: Subject to any disclaimer, the term of this patent is extended or adjusted under 35 U.S.C. 154(b) by 206 days.

(21) Appl. No.: 16/750,058

(22) Filed: Jan. 23, 2020

(65) Prior Publication Data

US 2020/0156580 A1 May 21, 2020

Related U.S. Application Data

(63) Continuation-in-part of application No. 15/772,096, filed as application No. PCT/PL2016/050049 on Oct. 26, 2016, now abandoned.

(30) Foreign Application Priority Data

Oct. 29, 2015 (PL) .......................................... 414614

(51) Int. Cl.
 *A42B 3/04* (2006.01)
 *B60R 21/02* (2006.01)
 *B60R 22/00* (2006.01)
 *B60R 21/00* (2006.01)

(52) U.S. Cl.
 CPC ............ *B60R 21/02* (2013.01); *B60R 22/001* (2013.01); *A42B 3/0473* (2013.01); *B60R 2021/0048* (2013.01); *B60R 2021/0086* (2013.01)

(58) Field of Classification Search
 CPC ........... A42B 3/06; A42B 3/0473; A42B 3/04; A41D 13/0512; B60R 2021/02
 See application file for complete search history.

(56) References Cited

U.S. PATENT DOCUMENTS

| | | | | |
|---|---|---|---|---|
| 5,267,708 | A * | 12/1993 | Monson | B64D 25/02 244/121 |
| 5,272,422 | A * | 12/1993 | Beaussant | A42B 3/0473 2/6.2 |
| 8,850,625 | B2 * | 10/2014 | Stiles | A42B 3/0473 2/421 |
| 2001/0002087 | A1 * | 5/2001 | Townsend | A42B 3/0473 280/801.1 |
| 2008/0209617 | A1 * | 9/2008 | Castillo | A41D 13/0512 2/461 |

* cited by examiner

*Primary Examiner* — Tajash D Patel
(74) *Attorney, Agent, or Firm* — Mark M. Friedman

(57) ABSTRACT

A head and neck support and protection device includes an arm that is pivotably mounted, at a first end, to a support and has at a second end a slidably-mounted element connected to a helmet clip. The helmet clip engages a helmet pin. A resistance block transfers energy into a vehicle chassis when the arm hits the resistance block. The slidably-mounted element slides out of the arm, in a controlled manner, when conditions indicating a crash have been met.

23 Claims, 46 Drawing Sheets

HEAD AND NECK SUPPORT AND PROTECTION DEVICE

REFERENCE TO PREVIOUSLY FILED APPLICATION

This application claims priority from a Polish patent application P.414614 filed on Oct. 29, 2015 and is a continuation-in-part of a utility patent application U.S. Ser. No. 15/772,096.

TECHNICAL FIELD

A HANS device (Head and Neck Support device), also known as a head restraint, is a safety item compulsory in many car racing sports. It reduces the likelihood of head and/or neck injuries, such as a basilar skull fracture, in the event of a crash (be it hitting another vehicle or a safety fence).

BACKGROUND ART

Prior art defines that the purpose of the HANS device is to keep the head from whipping forwards and backwards in a crash, (while also preventing excessive rotational movement, as secondary protection) without otherwise restricting movement of the neck.

In other words, the HANS allows the wearer to move their head as normal, but prevents/restricts head movements during a crash that would otherwise exceed the normal articulation range of the skeletal/muscular system and cause severe injury. In any kind of crash, the person's body, which isn't protected, is decelerated by the seat belt with the head maintaining velocity until it is decelerated by the neck.

The HANS device maintains the relative position of the head to the body, in addition to transferring energy to the much stronger chest, torso, shoulder, seatbelts, and seat as the head is decelerated (source: Wikipedia).

The HANS device is applicable in all motor sports, especially those where vehicles or boats do not comprise typical roof sections. Examples of use include formula racing cars, airplanes or speed boats where the head and the neck are exposed to high risks.

A driver, of a racing car, wears a special helmet connected to the HANS system. The head and neck protection, of the driver, is a result of restraining forces that are present especially during a crash or when the helmet is hit by a flying object (for example such objects are typically parts of tires or parts of chassis of other cars involved in a prior crash).

Presently, for such protective purposes, there are used (a) elastic sections attached to a chassis in the vicinity of a helmet, (b) raised side sections of the chassis in order to cover the helmet on its sides, (c) a foam-shell, collar-like device formed with a high collar, a left leg unit and a right leg unit connected to the high collar so that a U-shape is obtained or a set of nylon or steel cords connected to the helmet and configured to transfer a given force to a harness worn on driver's shoulders.

A prior art publication of FR2720988 entitled "Helmet restraint for driver of racing car or boat" discloses a restraint consisting of a plate fixed to a part of the vehicle chassis which is not susceptible to deformation, and a projecting rod on the top of the driver's crash helmet which engages with an aperture in the plate and is fixed once the driver is seated. The projection rod is of metal or composition, fastened through a hole in the top of the helmet and fixed by a nut. The plate can be fixed to e.g. a guard bar, either directly or via an intermediate element, and it can have a quick-release fitting. In a variant of the design the helmet projection can be replaced by a metal or composition cable with a hook connected to a ring on top of the helmet.

The solution of FR2720988 does not take into account movement of driver's body during a crash due to its fixed nature. A fixed mount of a helmet to a vehicle does not allow for the head and body movement during a crash thereby causing serious risk of injury and even death due to whiplash.

Further, the device of FR2720988 does not allow for rapid leaving of the vehicle, for example during a fire. Further, it does not restrain vertical movement that may lead to breaking of a spinal cord, in particular neck section. Additionally, the system does not protect head and neck from hits arriving from the top of the helmet.

A prior art publication of WO98/13232 entitled "device to prevent driver and pilot helmet oscillations" discloses a device to prevent oscillations of the helmet worn by car drivers and plane pilots, and features a frame incorporating a guide with means for the essentially vertical installation of said guide in the cockpit of the car or plane, a moving slide in said guide kept in a suspended position by means of dampers, an arm attached to said slide and positioned above the helmet, said arm having means for guiding and damping the motion of a cursor in a longitudinal direction, the cursor comprising means for clamping a pin which extends vertically from the top of the helmet.

The solution of WO98/13232 is very complex and does not protect a driver in case of a hit, of the helmet, by a part of another vehicle approaching from the top or in case of a hit into a safety fence. The solution does not restrain head movement around the vertical axis as a result of which there may occur breaking of a spinal cord, in particular neck section. The respective arm is insusceptible to deformations.

Another prior art publication of US2015/0020293 entitled "Head and Neck Support Device" discloses a head and neck support device for an occupant of a vehicle with a shoulder harness over the shoulders of the occupant and a helmet on a head of the occupant. The head and neck support device having a yoke, a tether, and at least one sleeve member, which has a cavity defined therethrough. The tether is configured to slide through the sleeve member cavity for a defined distance, which allows the occupant a greater range of side-to-side rotary head mobility.

The solution, according to the US2015/0020293, has a disadvantage that it does not protect a driver in case of a hit, of the helmet, by a part of another vehicle or in case of a hit into a safety fence.

A further prior art of DE4418179 entitled "Device protecting racing driver helmet from side force" discloses a device that protects a helmet of the driver of a racing vehicle against inertia forces acting on the driver in a direction essentially perpendicular to the direction of travel. The unit has a first lever which is fixed to the vehicle body and able to pivot, and also has releasable connection to the helmet. An equal and opposite weight to the accelerator inertia force is applied to the drivers helmet via the lever linkage. The lever linkage consists of a first and second lever.

A drawback of this solution of a lack of protection in case of a hit, of the helmet, by a part of another vehicle (any flying object in general) or in case of a hit into a safety fence. The solution does not restrain head movement around the vertical axis, as a result of which there may occur breaking of a spinal cord, in particular the neck section.

As shown above, current solutions do not sufficiently protect in case of a hit, of a helmet, by external elements like flying objects such as a part of another vehicle and thus do not provide sufficient safety to the head, the neck and the spine.

Known solutions protect mainly the neck, which may experience injury due to an inert movement of the head during a crash.

The helmet itself only partially protects the head while the neck is exposed to great forces, especially in case of impact from the top, that may cause severe spine injury and in some cases death.

The aim of the development of the present invention is an improved and cost effective Head and Neck Support And Protection device, which would also protect the head from impacts from the top as well as allow for rapid leaving of the vehicle, for example during a fire.

DISCLOSURE OF THE INVENTION

In one aspect, the present invention relates to a head and neck support and protection device, comprising: an arm being pivotably mounted, at a first end, to a support and comprising, at a second end, a slidably-mounted element connected to a helmet clip; wherein the helmet clip is configured to engage a helmet pin; a resistance block configured to transfer energy into a vehicle chassis when the arm hits the resistance block; wherein the slidably-mounted element is configured to slide out of the arm, in a controlled manner, when conditions indicating a crash have been met.

The device may further comprise a protective pin positioned in the arm and in the slidably-mounted element and configured to be cut by a force acting on the slidably-mounted element during a crash.

The arm may comprise an internal braking element configured to brake sliding of the slidably-mounted element out of the arm, wherein the braking element is mounted with a first end to the arm and with the other end to the slidably-mounted element.

The helmet clip may comprise a head having a rotation limiter of the helmet pin having a delimiting protrusion located at the top.

The helmet clip may allow for connecting the helmet pin using a hollow portion extending throughout its height, wherein the head further comprises a helical spring, mounted on the head, blocking balls to be received in cavities in the head, while the helmet pin comprises a circumferential groove for receiving the blocking balls, and a clamp ring comprising a grip of the clamp ring configured to block the helmet pin and the head in the helmet clip.

The resistance block may be fixed to the vehicle chassis or a shell surrounding a driver's helmet whereas the shell is fixed to the vehicle chassis, or wherein the resistance block forms a part of the vehicle chassis.

The support may be a carrying shaft positioned perpendicularly to a longitudinal axis of the arm and fixed to the vehicle chassis.

The carrying shaft may comprise, at its ends, threaded openings, in which there are positioned first ends of threaded mandrels, wherein second ends of the threaded mandrels are mounted to threaded elements fixedly mounted to the vehicle chassis.

On the carrying shaft, between each of the threaded mandrels and the arm, there may be energy absorbing elements.

The arm may be positioned in a middle of the carrying shaft.

Between engaging surfaces of the arm and the slidably-mounted element there may be a friction reducing agent.

The arm may have an attached element configured to compensate a weight of the device and a driver's helmet.

The attached element may be at least one element selected from a group comprising: a spring, a counterweight, an actuator or a magnet.

The helmet clip may comprise, within its hollow space, a head having a rotation limiter of the helmet pin, a helical spring positioned around the vertical portion of the head, blocking balls positioned in grooves of the head, whereas the helmet pin comprises a circumferential groove for receiving the blocking balls, and a clamp ring, wherein an opening, present in the top section of the helmet clip, is configured to receive a covering shield having an opening.

A connection between slidably-mounted element and the helmet clip may be configured to facilitate a nodding movement or that a connection between the helmet clip and the helmet pin is configured to facilitate a nodding movement.

The device may further comprise a protective pin positioned in the arm and in the slidably-mounted element and configured to be cut by a force acting on the slidably-mounted element during a crash.

The helmet may have a flattened top portion.

The device may comprise a head support tape or rope attached at one end to the vehicle chassis and at the other end to the slidably-mounted element of the arm.

The head support tape or rope may be attached in its middle portion to the helmet.

The head support tape or rope may be attached to a holder at the back of the helmet.

The head support tape or rope may be attached to yokes at the sides of the helmet.

The head support tape or rope may be attached to the vehicle chassis via at least one of: a holder, an actuator, a pretensioner, a spring.

The device may comprise a sideward limiting actuator formed by a cylinder formed within the arm and a piston movable horizontally within the cylinder, the piston having two opposite piston rods connected to the vehicle chassis.

The device may further comprise a head support tape or rope attached at one end to the vehicle chassis and at the other end to the arm.

BRIEF DESCRIPTION OF THE DRAWINGS

These and other objects of the invention presented herein, are accomplished by providing the Head and Neck Support And Protection device. Further details and features of the present invention, its nature and various advantages will become more apparent from the following detailed description of the preferred embodiments shown in a drawing, in which.

MODES FOR CARRYING OUT THE INVENTION

The embodiments presented herein refer to a formula car and all particular values of forces will be presented with reference to this motor sport. In case of other motor sports, such as airplanes or speed boats, other forces may apply and appropriate adjustments may be made.

Figure 1:
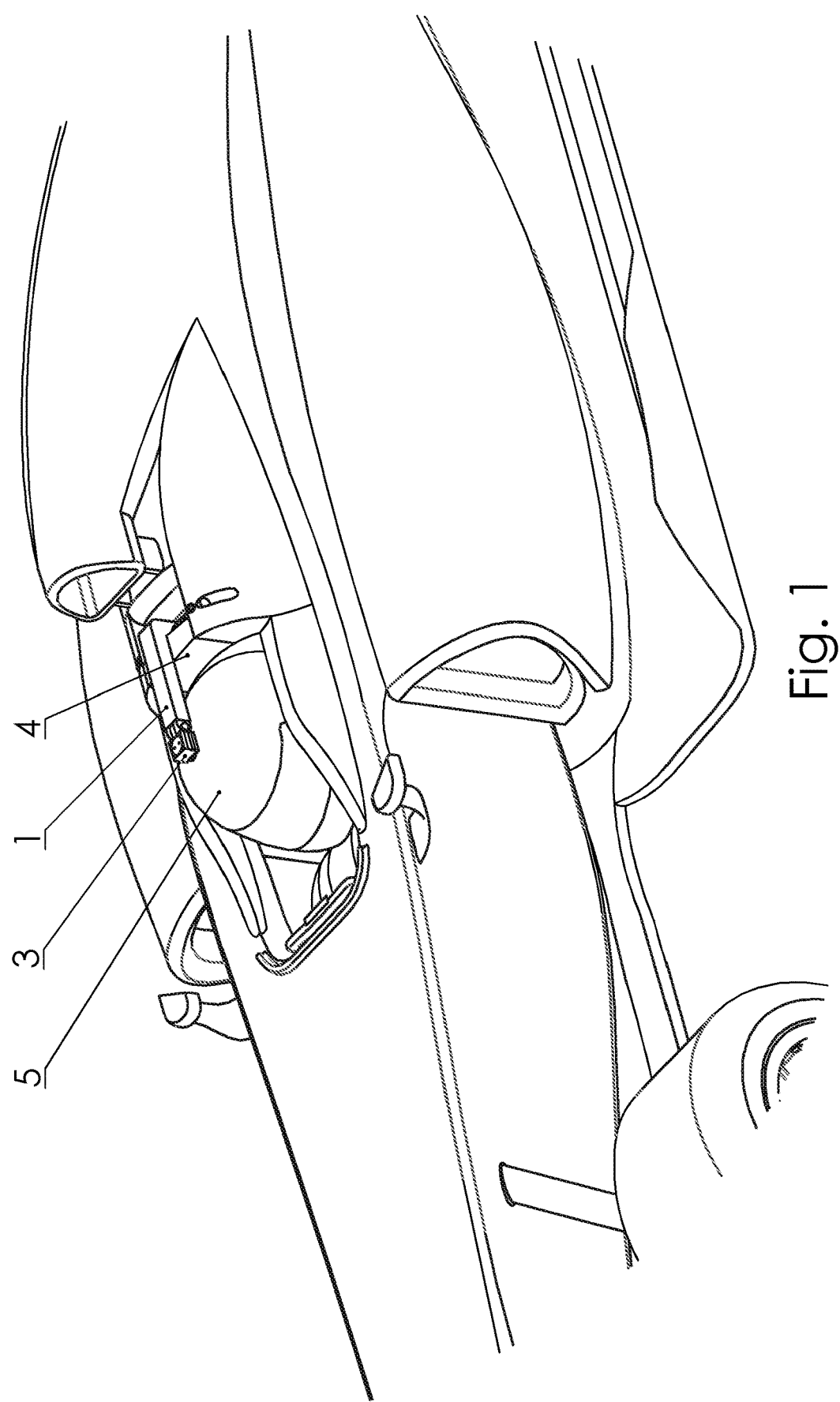
FIGS. 1 and 1A depict a section of a formula car comprising the head and neck support and protection device according to the present invention.

FIG. 1 depicts a section of a formula car comprising the head and neck support and protection device according to the present invention. The head and neck support and protection device comprises an arm 1, having a slidably-mounted element 2 for releasably (preferably) connecting it to a helmet clip 3.

The slidably-mounted element 2 may slide on or within the arm 1 depending on the selected embodiment. In a preferred embodiment of the device, the slidably-mounted element 2 slides within the arm 1, in a hollow portion adapted for this purpose.

The helmet clip 3 is configured to engage a helmet pin 22 (shown in the remaining drawings), preferably being releasably fixed to a helmet 5. The helmet clip 3, depending on its embodiment, allows for left/right rotational head movement or full movement as naturally allowed by the wearer's neck.

Preferably, the helmet clip 3 has a quick release system, activated when pulled up, which at the same time may not accidentally release while driving.

Under the arm 1, there is positioned a resistance block 4, fixed to the chassis, forming a support for the arm 1 during vertical movements (towards the bottom of the vehicle) of a helmet 5 clipped to the helmet clip 3. In its closed position, when the slidably-mounted element 2 engages the helmet clip 3, the arm 1 preferably rests on the block 4 (or is relatively close to it).

In other embodiment, the arm 1 is preferably spaced by less than 1 cm from the block 4. In case of an impact from the top, the arm 1 will be blocked by the resistance block 4.

The resistance block 4 therefore, disallows excessive movement of the helmet 5, attached to the device according to the present invention, downwards beyond natural movement range of a driver's head. Thus, injuries arising from pushing one's head downwards, while being sited are hereby addressed.

The natural movement range obviously depends on the particular driver and may be adjusted.

Figure 29:
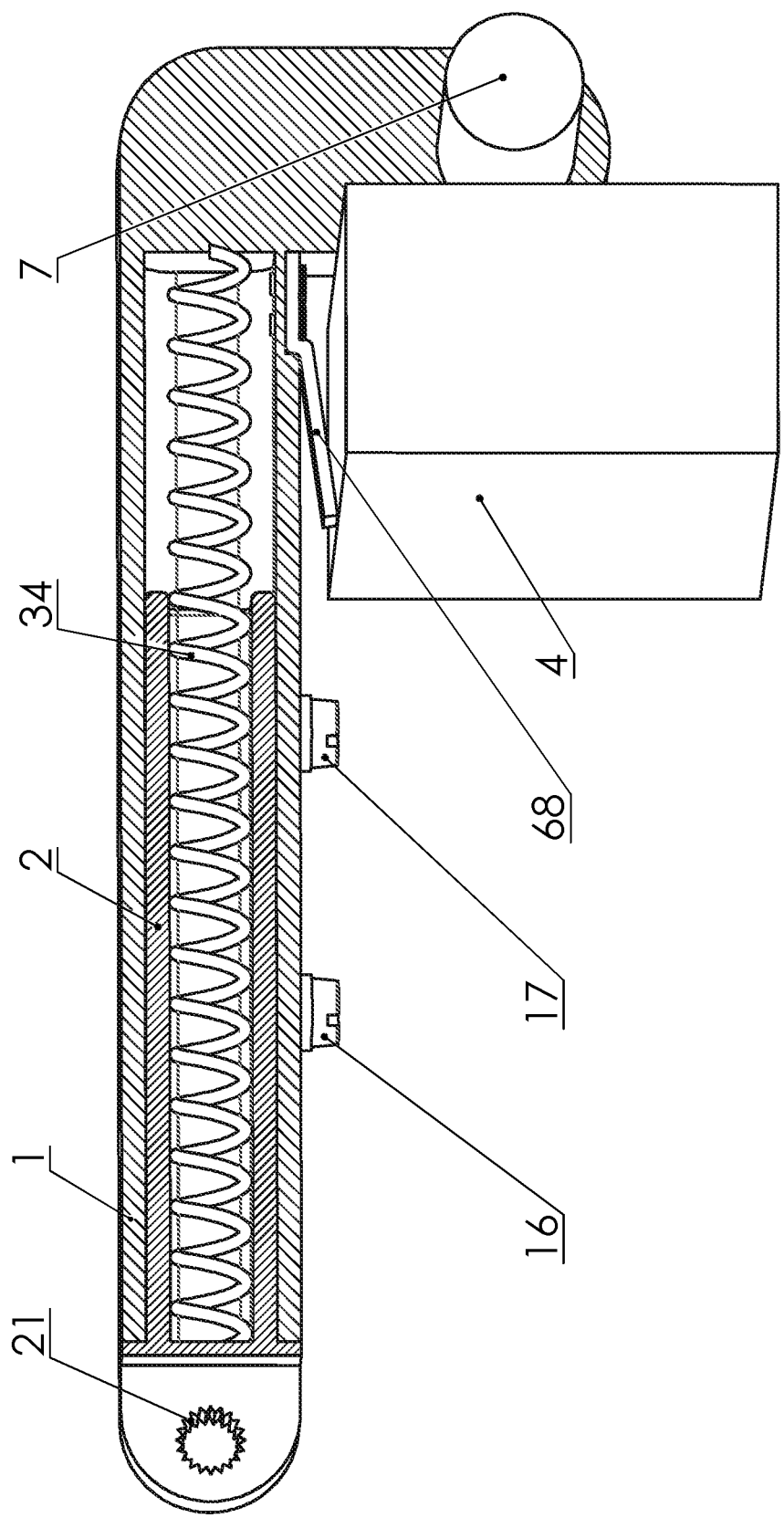
FIG. 29 depicts the arm having an additional damping element engaging a resistance block.

A further embodiment of the spacing between the arm 1 and the resistance block 4 will be shown with reference to FIG. 29.

The arm 1 may comprise a mounting element (e.g. opening) 6 for receiving a carrying shaft 7 (shown in FIG. 2) in order to form a pivotable connection. Thus, the arm 1 is rotatably/pivotably mounted to a support (be it the resistance block 4 or the formula car chassis). Advantageously, the arm 1 is positioned in the middle of the carrying shaft 7 (shown in FIG. 2).

The rotatable/pivotable mount allows for the arm 1 to move away from the helmet, when the helmet clip 3 is disengaged, in order to facilitate easier positioning for the driver.

Figure 2:
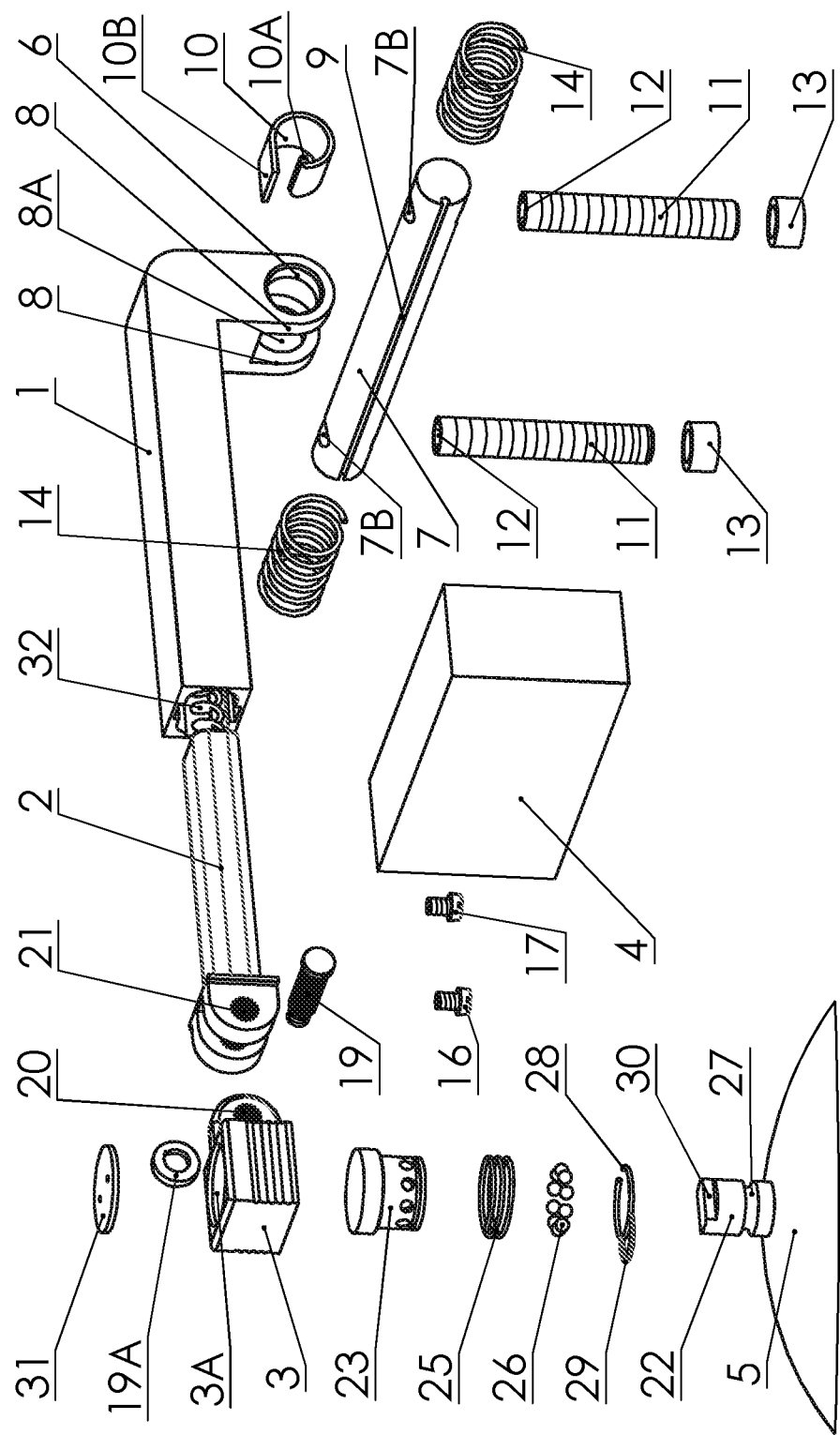
FIG. 2 shows an exploded view of the head and neck support device according to the present invention.

As shown in FIG. 2, the arm 1 has the helmet clip 3 at its end opposite to the pivotable mount.

In preferred embodiments the slidably-mounted element 2 and the resistance block 4 are made from titanium, graphene, carbon fiber or similar.

Figure 1A:
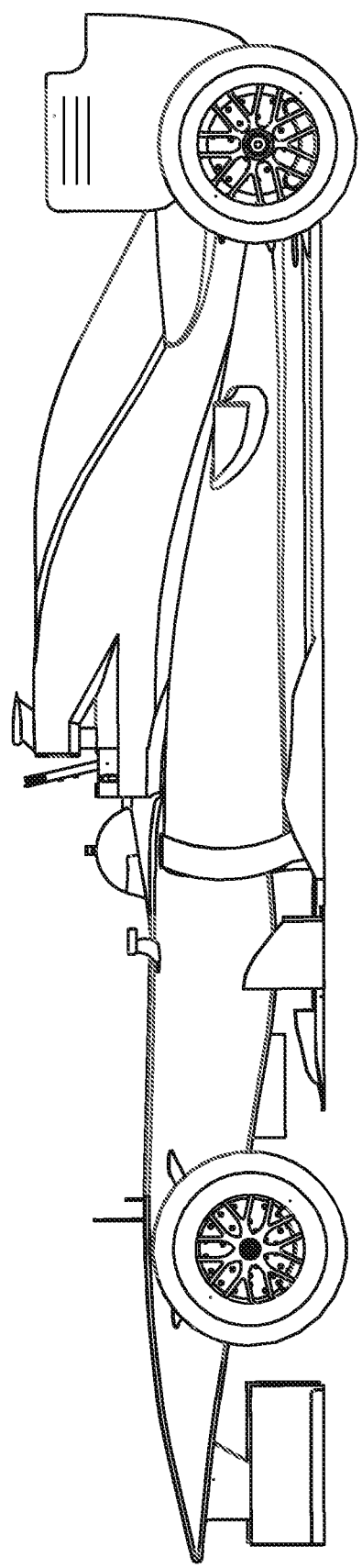

In FIG. 1A the head and neck support and protection device, according to the present invention, is shown in its opened form, ready to mount a helmet 5 worn by a driver.

FIG. 2 shows an exploded view of the head and neck support and protection device according to the present invention. The arm 1 (preferably L-shaped or J-shaped or S-shaped or Z-shaped or Y-shaped or the like) is preferably positioned such that its longer section extends towards the helmet 5 while its shorter section extends towards the bottom of the vehicle. The shape of the arm 1 mainly depends on the shape of the chassis and available space.

In another embodiment of the present invention, the head and neck support and protection device may have its shape adapted to the size and shape of the helmet 5 as well as the shape of the chassis in dependence with the constructional requirements.

In case of an L-shaped arm 1, as shown in FIG. 2, its longer section is arranged substantially horizontally (while pointing towards a direction of movement of a respective vehicle) while its short section is arranged substantially vertically (pointing downwards of the respective vehicle).

The arm 1 may comprise a mounting element 6, 8 for receiving the carrying shaft 7. In a particular embodiment, the mounting element may be an opening 6, positioned in an axis perpendicular to the length of the arm 1, the opening 6 being positioned at the far end of the shorter section of the arm 1. Further, there may be present a hollow section 8A in the mounting element, such that two arms 8 with respective openings 6 are present, as shown in FIG. 2 (the carrying shaft 7 is to be inserted perpendicularly to the axis of the longer section of the arm 1).

The carrying shaft 7 may comprise a lengthwise groove 9, while there may be present a spring element 10 between the two arms 8. The spring element 10 has a bent section 10A that fits the lengthwise groove 9.

The spring element 10 partly surrounds the carrying shaft 7 (preferably to the extent allowed by the hollow section in the mounting element) while the other end 10B of the spring element 10 adheres, with its flat surface, to the arm 1 between the two arms 8 as shown in FIG. 2. The flat surface acts like a spring and neutralizes the weight of the helmet and the device itself. Owing to that, the helmet 5 may be heavier and thereby safer since the driver will not feel the extra weight.

The carrying shaft 7 may be connected to the chassis so that it is positioned parallel to the left-right axis of the vehicle. For this purpose the carrying shaft 7 may comprise, preferably at its ends, threaded openings 7B, in which there may be positioned threaded mandrels 11, preferably comprising nests for an allen key 12.

The other ends of the threaded mandrels 11 are mounted to threaded elements 13, being preferably inner-threaded bushes, fixedly mounted to a chassis of a vehicle.

With a use of an allen key, one may adjust the positioning of the carrying shaft 7 in the vehicle's chassis, depending on the driver's height and positioning of the respective helmet 5.

On the carrying shaft 7, between the arm 1 and each of the threaded mandrels 11, there are preferably positioned helical springs 14 of the carrying shaft 7. The helical springs 14 prevent excessive movement of the helmet 5 while taking corners (due to high centrifugal force) as well as during impacts into the helmet 5 from the left/right side. At the same time, the helical springs 14 allow some movements, which feels more comfortable.

The slidably-mounted element 2 comprises a lengthwise groove 15 (preferably at a side facing downwards) while the arm 1 comprises, in its longer section, at least one opening for receiving a limiter 16 for limiting movement of the slidably-mounted element 2 within the arm 1. The limiter 16 may be a screw, preferably made from steel, which moves in the lengthwise groove 15.

When a driver's head moves forward together with the helmet 5, the limiter 16 limits the length, by which the slidably-mounted element 2 may pull out from the arm 1.

In the arm 1, there may be present a protective pin 17, for example a screw made from a soft metal or plastic (depending on the requirements, the protective pin 17 must be cut in case of a force equal or above 7 g). In case of an abrupt movement of the slidably-mounted element 2 out of the arm 1, typically caused by hitting an obstacle, the protective pin 17 is cut (by a force acting on the slidably-mounted element 2 wherein the force is a result of a crash).

Figure 25:
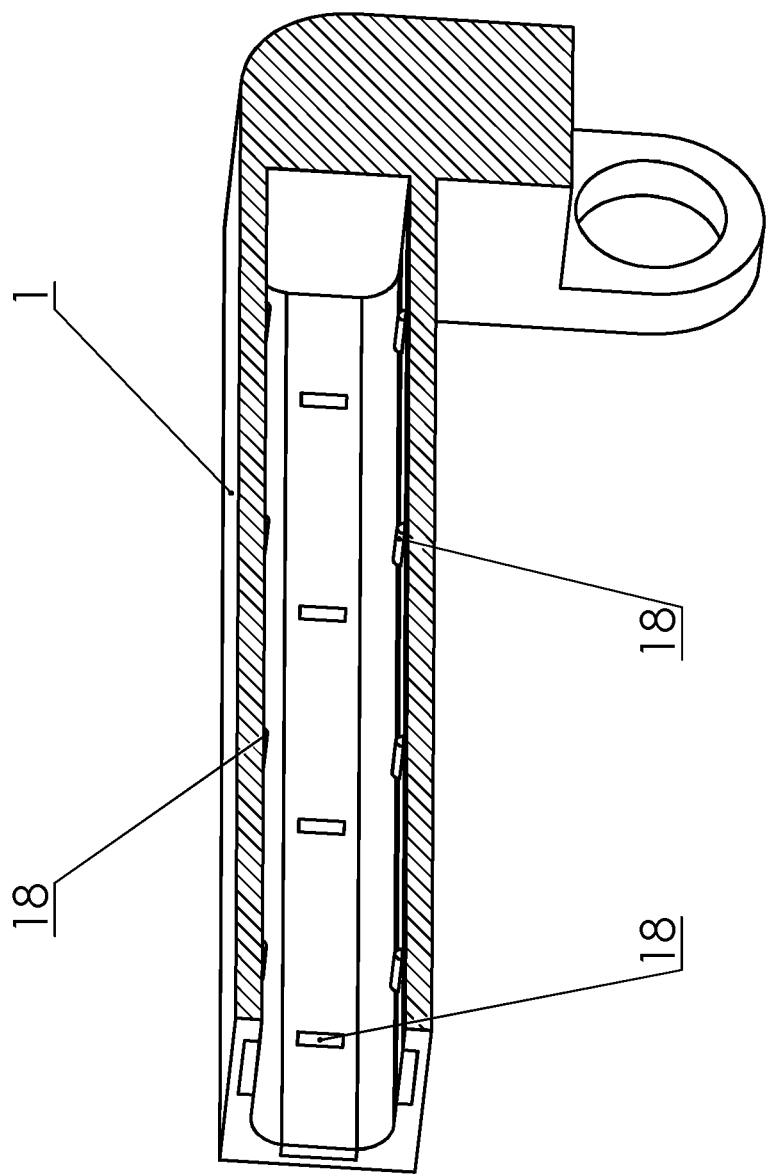
FIG. 25 presents a lengthwise cross section of the arm comprising bearings.

Between the arm 1 and the slidably-mounted element 2, there are bars comprising bearing elements 18 (as shown in FIG. 25) facilitating movement of the slidably-mounted element 2.

Alternatively, between engaging planes of the arm 1 and the slidably-mounted element 2, there is a friction reducing agent, preferably a suitable lubricant or a Teflon layer.

The end of the slidably-mounted element 2, protruding from the arm 1, is in this embodiment releasably connectible to the helmet clip 3. Preferably, the connection is a bolt 19 connecting suitable elements 20, 21 of the slidably-mounted element 2 and the helmet clip 3. The bolt is preferably inserted perpendicularly to the axis of the longer section of the arm 1.

In a preferred embodiment, to this end the slidably-mounted element 2 comprises an opening 21 (preferably in a suitable ear mount with an opening positioned perpendicularly to the axis of the longer section of the arm 1) for receiving the bolt 19 while also the helmet clip 3 comprises a similar opening 20 (preferably in a suitable ear mount with an opening positioned perpendicularly to the axis of the longer section of the arm 1) for receiving the bolt 19, as shown in FIG. 2.

Thus, the bolt 19 positioned in the openings 20, 21 will connect the helmet clip 3 and the slidably-mounted element 2 once a nut 19A is fixed on the bolt 19. Naturally, other connecting means than a nut 19A may be applied as will be evident to one skilled in the art.

The connection between the slidably-mounted element 2 and the helmet clip 3 may be fixed, as shown in FIG. 2, or pivotable as shown later with reference to FIG. 20 and FIG. 21.

Figure 8:
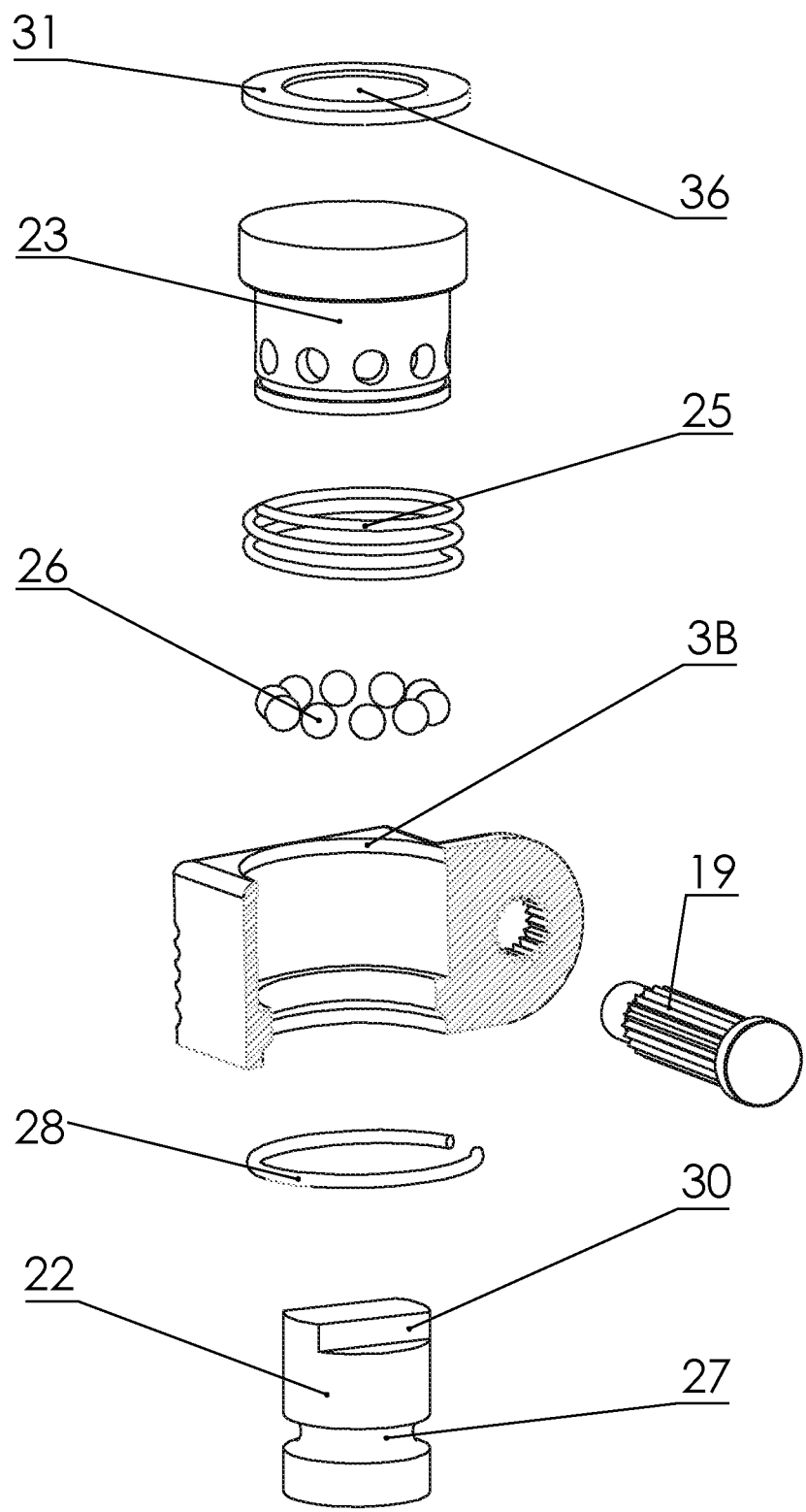
FIG. 8 shows a variant of the helmet clip having a protective cap comprising an opening.

In this embodiment, the helmet clip 3 allows for connecting a helmet pin 22 and has a hollow portion extending throughout its height 3A (shown in more details in its cross-section shown in FIG. 8).

The helmet clip 3 comprises a head 23 having a rotation limiter of the helmet pin 22, a helical spring 25, blocking balls 26, the helmet pin 22, preferably comprising a circumferential groove 27 for receiving the blocking balls 26, and a clamp ring 28 comprising a grip 29 of the clamp ring 28.

The helical spring 25 is mounted on the head 23 (adhering to its external side walls). Next, the blocking balls 26 are input into the cavities (present at its circumference as shown in FIG. 2) in the head 23. The head 23 is positioned, from the top via the respective opening, in the helmet clip 3. The helical spring 25 holds the blocking balls 26, while the clamp ring 28 keeps all these elements in the helmet clip 3, until release.

The helmet pin 22, comprises a delimiting protrusion 30 at its top section, engaging a rotation limiter (elements 30 and 24 as shown in more details in FIG. 7) of the helmet pin 22, which results in limiting left-right, rotational, head movement of the driver.

The hollow portion 3A, extending throughout the height of the helmet clip 3, may be preferably covered with a corresponding protective cap 31. In another embodiment of the present invention, the hollow portion 3A of the helmet clip 3 may only be a cavity for receiving elements 23-29.

Figure 3:
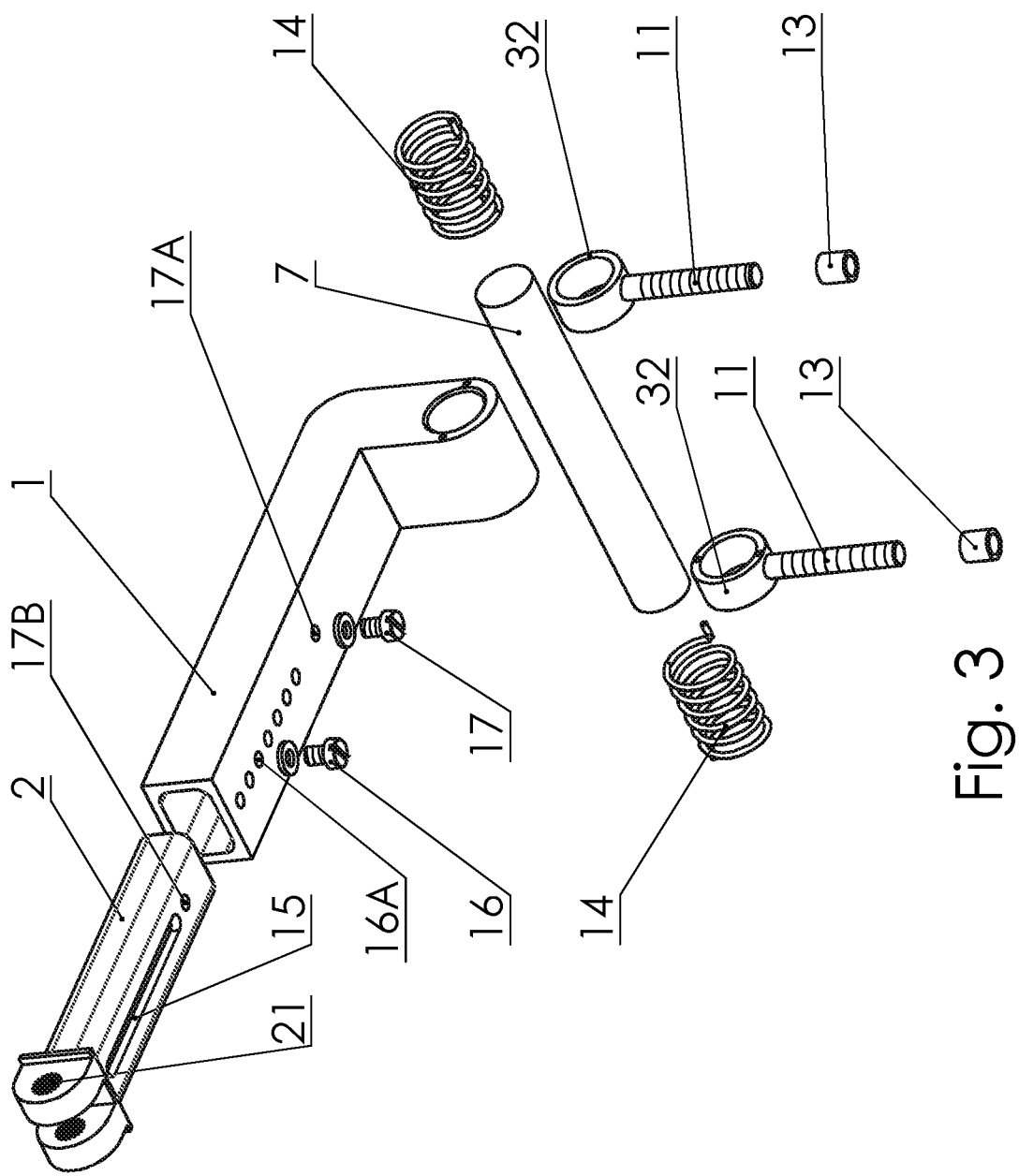
FIG. 3 presents an exploded view, from the bottom, of the head and neck support device.

FIG. 3 presents an exploded view, from the bottom, of the head and neck support device. The arm 1 has, at its longer section, at least one threaded opening 16A allowing for adjusting a length of movement of the slidably-mounted element 2 depending, in which threaded opening a limiter 16 is screwed in.

The protective pin 17, positioned in a blocking opening in the arm 1 (herein the blocking opening is positioned at the bottom of the longer portion of the arm 1), is also positioned at the same time in the respective opening 17B in the slidably-mounted element 2.

Thus, the slidably-mounted element 2 is configured to slide out of the arm 1, in a controlled manner, when conditions indicating a crash have been met.

A variant of the carrying shaft 7, shown in FIG. 3, has its ends positioned in bushes fixed to the threaded mandrels 11, which are fixed with their far ends to the threaded elements 13, being preferably inner-threaded bushes, fixedly mounted to a chassis of a vehicle.

Figure 4:
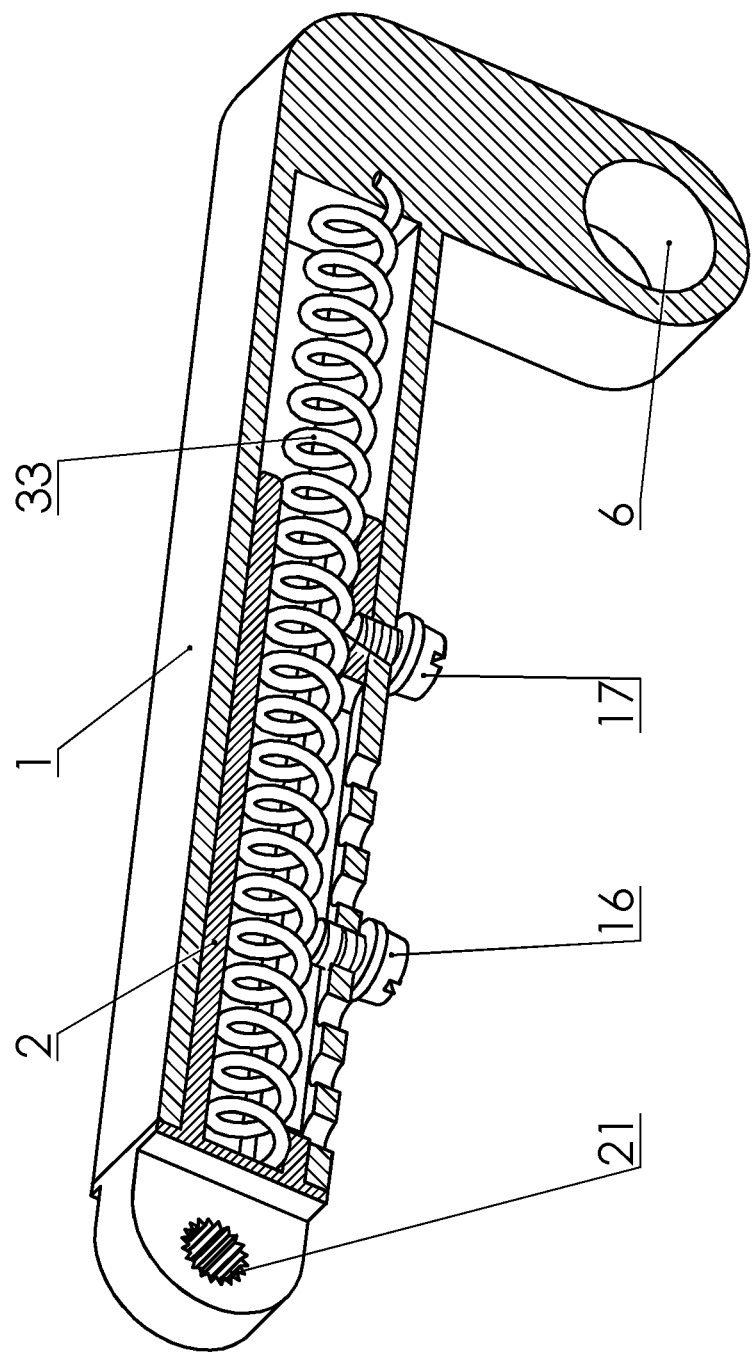
FIG. 4 depicts a lengthwise cross-section of the arm with a helical spring.

FIG. 4 depicts a lengthwise cross-section of the arm with a helical spring 33 inside it. The helical spring 33 extends lengthwise, inside the slidably-mounted element 2 and the longer section of the arm 1.

One of the ends of the helical spring 33 may be fixedly mounted to the arm 1 while the other end may be fixedly mounted to the slidably-mounted element 2 in proximity to the opening 21. The function of the helical spring 33 is to restrain movement of the slidably-mounted element 2.

Figure 5:
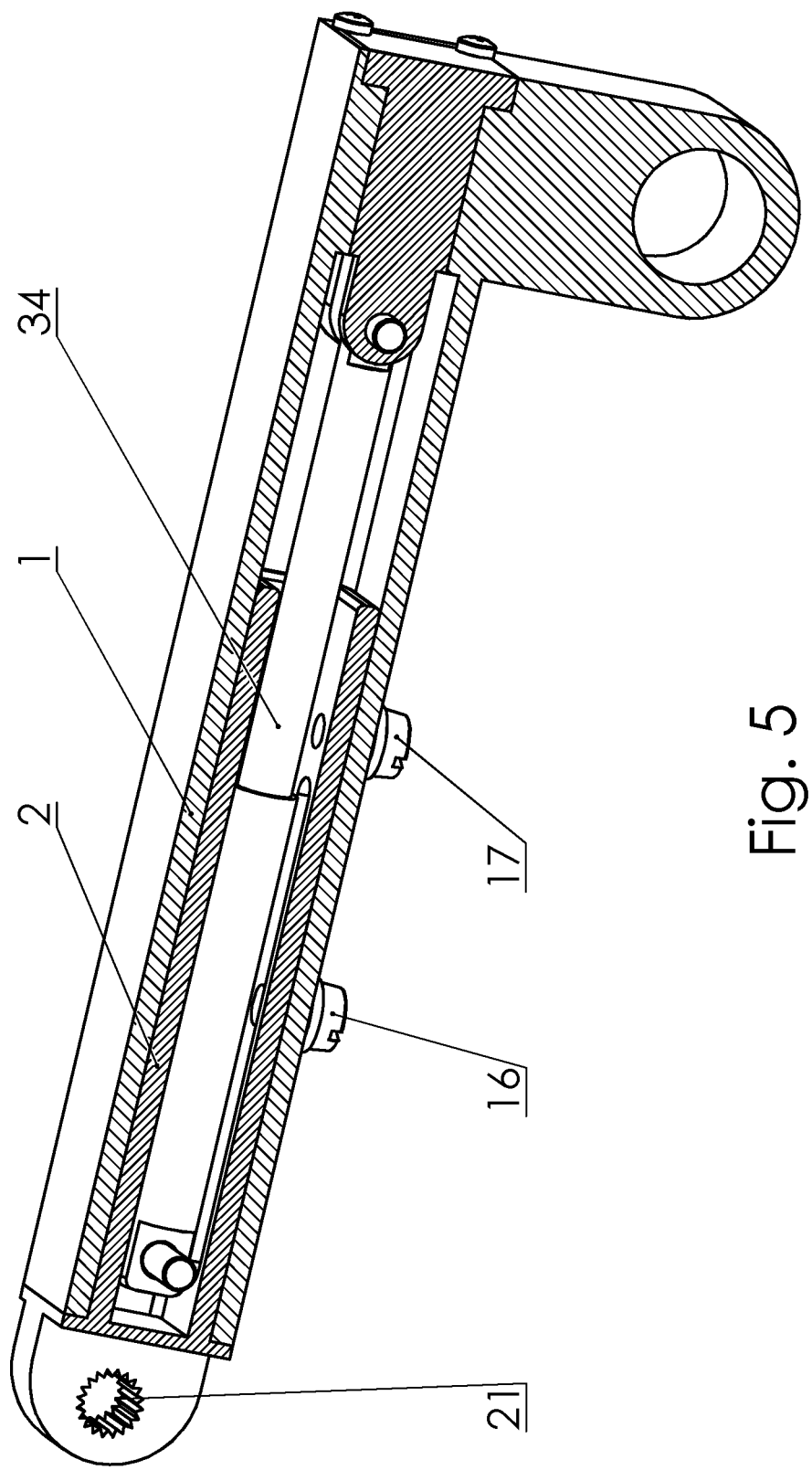
FIG. 5 depicts a lengthwise cross-section of the arm with a damper.

FIG. 5 depicts a lengthwise cross-section of the arm with a damper. The function of the damper 34 is to restrain movement of the slidably-mounted element 2. One of the ends of the damper 34 may be fixedly mounted to the arm 1 (further end from the helmet clip 3) while the other end may be fixedly mounted to the slidably-mounted element 2 in proximity to the opening 21.

A suitable damper may be an oil damper, air damper or a gas spring or an alternative element serving the same function.

Figure 6:
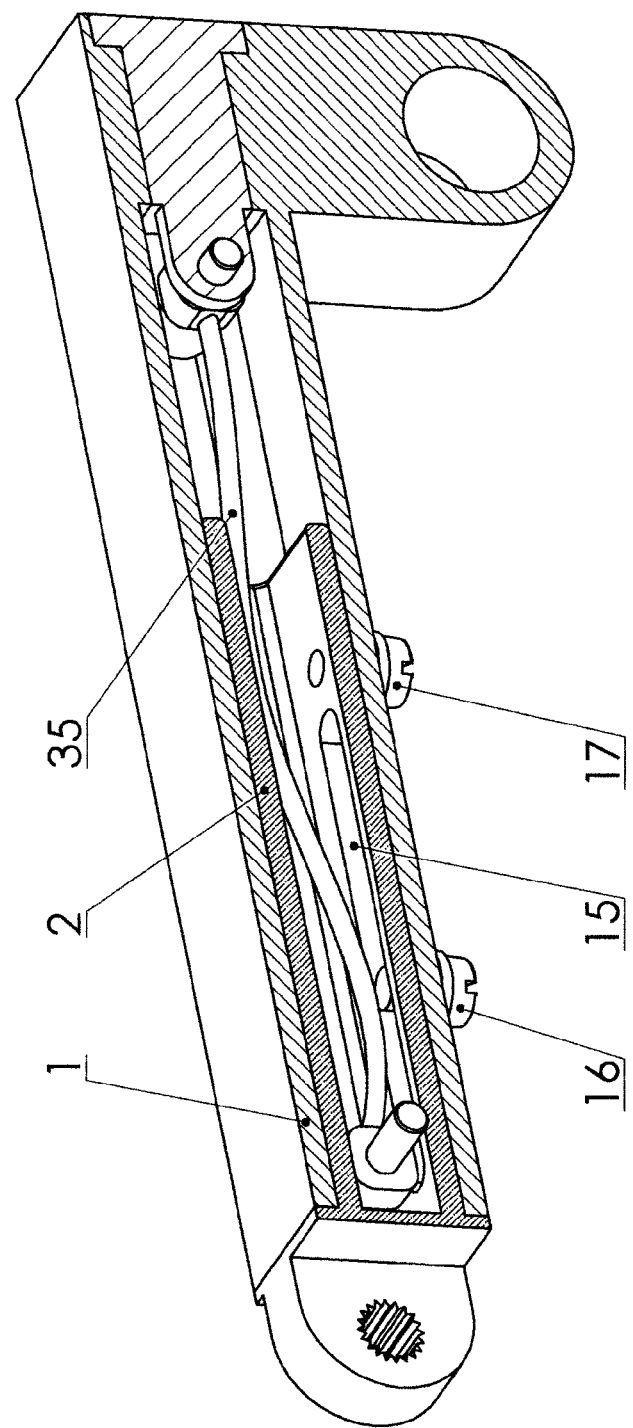
FIG. 6 depicts a lengthwise cross-section of the arm with an elastic cord.

FIG. 6 depicts a lengthwise cross-section of the arm with an elastic cord 35. The function of the elastic cord 35 is to restrain movement of the slidably-mounted element 2. One of the ends of the elastic cord 35 may be fixedly mounted to the arm 1 (further end from the helmet clip 3) while the other end may be fixedly mounted to the slidably-mounted element 2 in proximity to the opening 21.

The helical spring 33, the damper 34 and the elastic cord 35 are all internal braking elements configured to brake sliding of the slidably-mounted element 2 out of the arm 1.

As shown in FIGS. 4-6, the slidably-mounted element 2 may, during normal driving, either (A) be substantially fixed (not movable) or (B) movable.

In the variant (A), the helical spring 33 and/or damper 34 keep the driver's head substantially fixed and preferably significantly limit the linear forces (in the axis of the length of the longer section of the arm 1) in a range of up to 6-7 g. When a force in a range of 6-7 g is reached (i.e. when conditions indicating a crash have been met), the protective pin 17 is cut and the slidably-mounted element 2 moves forward (to its maximum extent allowed in order to protect from neck injury.

The maximum extension allowed, of the slidably-mounted element 2, depends first on the driver and second on the physical structure of the formula car, but typical values will range from 5 to 10 centimeters.

In the variant (B) the helical spring 33 or damper 34 or the elastic cord 35 allow for some head movement, depending on driver's preferences, in a range of up to 6-7 g.

Figure 7:
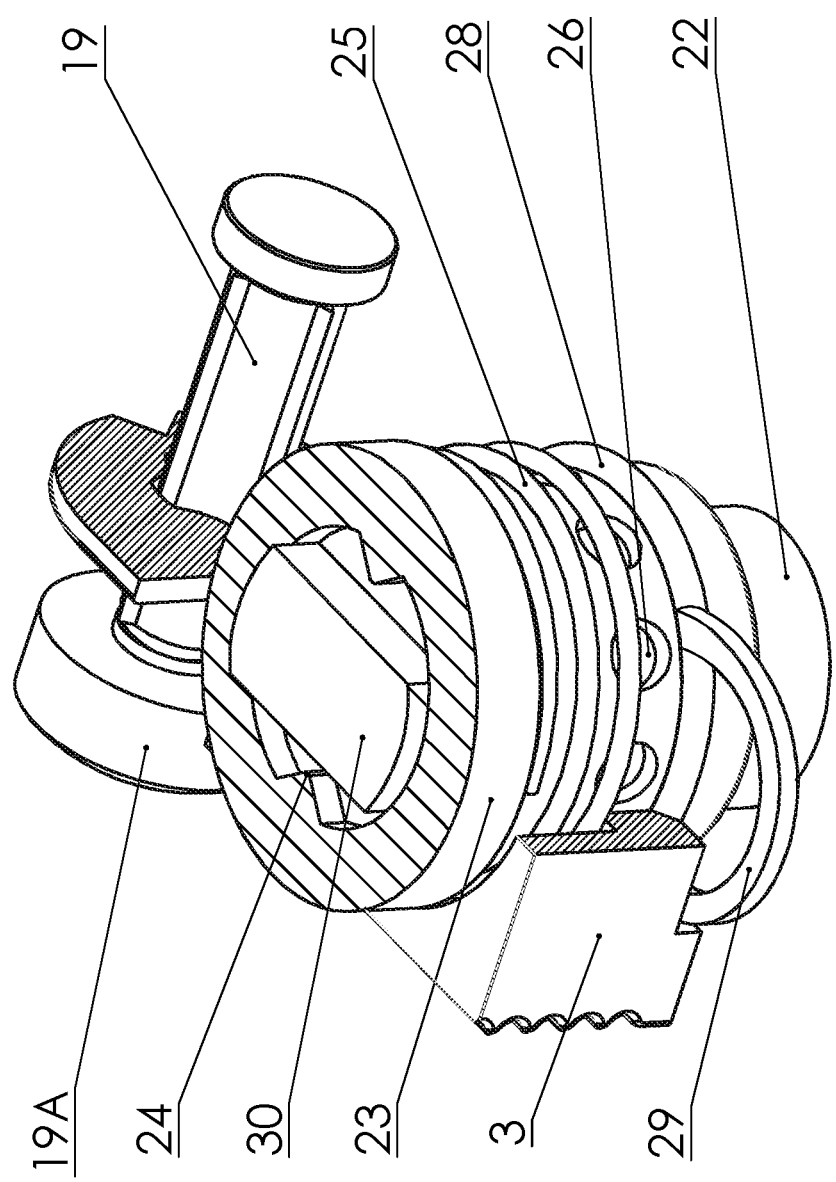
FIG. 7 presents a section of the helmet clip with a focus on the rotation limiter.

FIG. 7 presents a section of the helmet clip 3 with a focus on the rotation limiter. The helmet clip 3, herein shown in an assembled version, comprises herein a hollow portion 3A (as shown in FIG. 2), in which there is positioned the head 23 comprising a rotation limiter 24 of the helmet pin 22 having he delimiting protrusion 30 located at its top. A suitable form of the rotation limiter 24 is a tooth or a protrusion or more than one thereof engaging the delimiting protrusion 30.

For example, the rotation limiter 24 may limit the rotation at the amount of 80 to 90 degrees to either side. In a test embodiment, the angle was further limited to 45-55 degrees to either side. This value must be adjusted to a given kind of motor sport, depending on safe values for a driver as well as requirements of a given sport.

The head 23 is positioned inside the hollow portion 3A (as previously shown in FIG. 2) of the helmet clip 3, wherein the head 23 has a T-shape cross-section (vertically via its center). Around the vertical portion of the T-Shape, there is positioned the helical spring 25. Further, the head 23 comprises grooves for receiving the blocking balls 26. Additionally, the helmet pin 22 preferably comprises the circumferential groove 27 for receiving a clamp ring 28 comprising a suitable grip 29 of the clamp ring 28. Therefore, the clamp ring 28 locks the helmet pin 22 in the helmet clip 3.

In order to attach the helmet 5 to the helmet clip 3, the grip 29 of the clamp ring 28 must be held and the helmet pin must be pulled up, while positioning the helmet pin 22 in the head 23. The blocking balls 26 and the clamp ring 28 block self disconnection of the helmet 5 from the helmet clip 3.

In order to disconnect the helmet 5 from the helmet clip 3 the helmet clip must be pulled up.

The head 23 positioned in the helmet clip 3 may not rotate due to its protrusion (not shown on the drawing) engaging a cavity connected with the hollow portion 3A of the helmet clip 3.

FIG. 8 shows a variant of the helmet clip having a protective cap comprising an opening. The embodiment of the helmet clip 3 comprises a head 23 having a rotation limiter (elements 30 and 24 as shown in more details in FIG. 7) of the helmet pin 22.

The head 23 is positioned inside the hollow portion 3A (as previously shown in FIG. 2) of the helmet clip 3, wherein the head 23 has a T-shape cross-section (vertically via its center). Around the vertical portion of the T-Shape, there is positioned the helical spring 25. Further, the head 23 comprises grooves for receiving the blocking balls 26.

The helmet pin 22, preferably comprises a circumferential groove 27 for receiving blocking balls 26, and a clamp ring 28.

An opening 3B present in the top section of the helmet clip 3 is configured to receive a covering shield 31 having an opening 36.

In order to connect the helmet 5 to the helmet clip 3, one must pull the helmet clip 3 up while appropriately holding the head 23 with a finger placed in the respective opening 36.

In order to disconnect the helmet 5 from the helmet clip 3, one must pull up the helmet clip 3 and, with a rotational movement, move the arm 1 above driver's head. The arm 1 will rotate (pivot) on the carrying shaft 7.

A difference between the embodiments shown in FIG. 7 and FIG. 8 thus lies in different actions required to attach the helmet 5 comprising a respective helmet pin 22 to the helmet clip 3. Specifically, in the embodiment of FIG. 7 one needs to hold the grip 29 of the clamp ring 28 and pull up the helmet clip 3 thereby positioning the helmet pin 22 in the head 23. In turn, in FIG. 8 embodiment one needs to hold the head 23, with a finger inserted via the opening 36, and pull up the helmet clip 3.

Figure 9:
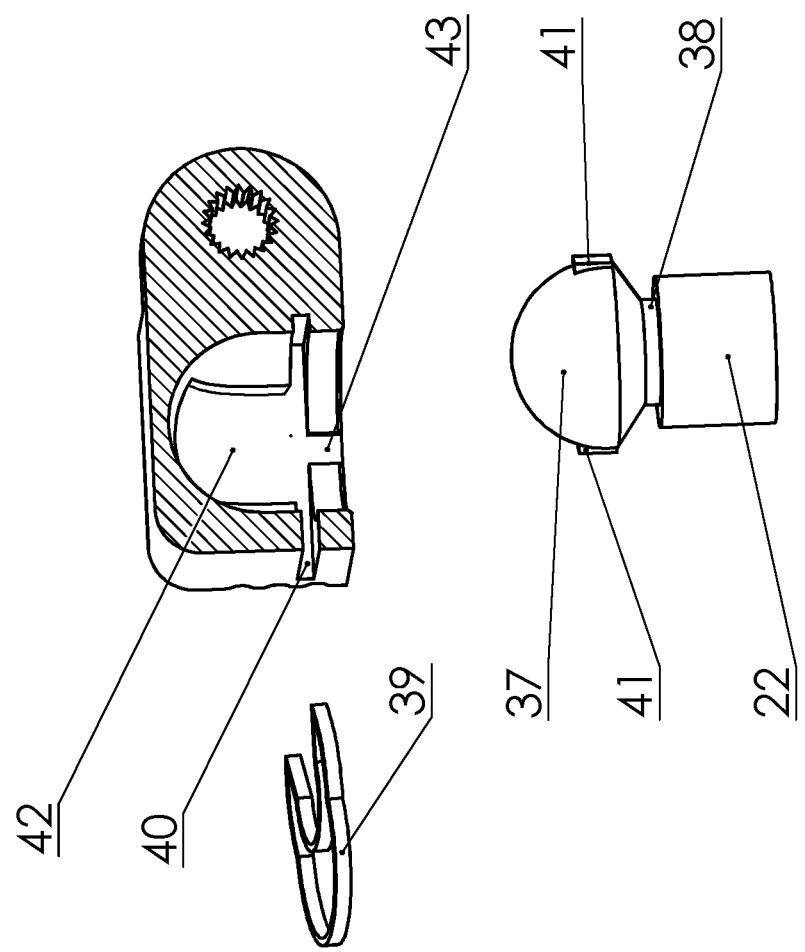
FIG. 9 depicts a variant of the helmet clip comprising a spherical member having two protrusions and a full recess in the helmet clip.

FIG. 9 depicts a variant of the helmet clip comprising a spherical member 37 having two protrusions 41 and a full recess 42 in the helmet clip 3. The spherical member 37 is located at the top of the helmet pin 22 and is configured to engage a hollow portion 42 of the helmet clip 3.

The helmet pin 22 has, under the spherical member 37, a circumferential recess 38 configured to receive a spring clip 39. The helmet clip 3 has a cut out portion 40 for receiving the spring clip 39 so that the helmet pin 22 inserted inside the hollow portion 42 may be locked within. Once locked, the helmet pin may be disengaged by pulling out the spring clip 39 using its grip portion.

The spherical member 37 may further comprise two protrusions 41, preferably opposite each other, configured to engage the hollow portion 42 of the helmet clip 3 and to be inserted via guiding sections 43 present in the helmet clip 3.

In order to disconnect the helmet 5 from the respective helmet clip 3, one must pull out the spring clip 39 from the cut out portion 40 and with a rotational movement pull the arm 1 over driver's head. The arm 1 will rotate (pivot) on the carrying shaft 7.

The embodiment of the helmet clip 3, shown in FIG. 9, allows for freedom of movement of driver's head within a safe range.

Figure 10:
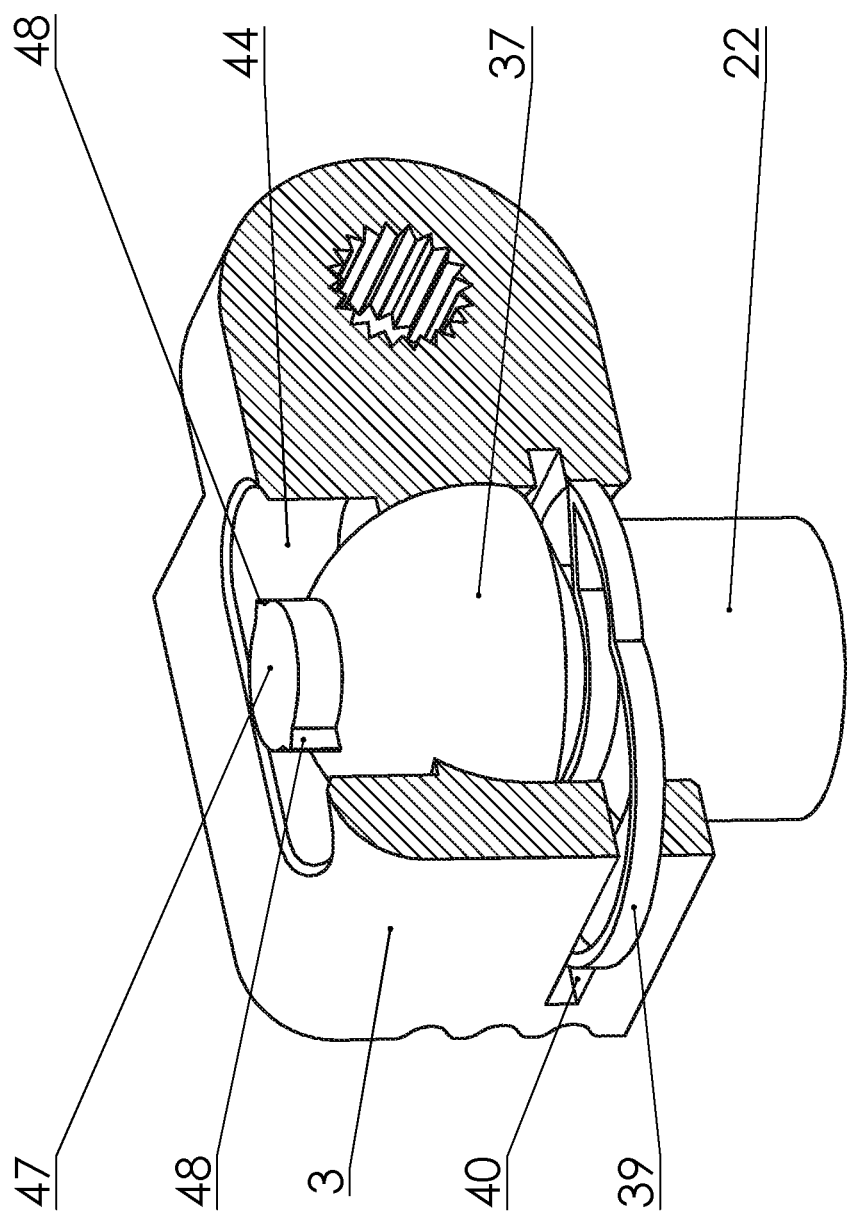
FIG. 10 presents a variant of the helmet clip comprising a spherical member having two protrusions and a partial recess in the helmet clip.

FIG. 10 presents a variant of the helmet clip comprising a spherical member 37 having two protrusions and a partial recess in the helmet clip 3. The spherical member 37 has a top member 47 in a form of a disc having two opposite protrusions 48.

The helmet clip 3 has a partial cavity 44, in which the top member 47 is positioned, allowing a horizontal movement of the driver's head. The two opposite protrusions 48, restrict a rotational movement of the helmet pin 22 having the top member 47.

A difference between the full recess 42 in the helmet clip 3 (FIG. 9) and the partial recess in the helmet clip 3 (FIG. 10) is that the partial recess is configured to allow for a natural, horizontal movement (looking left/right) of a helmet 5 only while the full recess allows helmet 5 movements in all axes but restricted to natural head movement range of angles (for example by a use of appropriate protrusions).

Thus, the embodiment of FIG. 10, in particular a connection between the helmet clip 3 and the helmet pin 22, is configured to facilitate a nodding movement.

The helmet pin 22 has, under the spherical member 37, the circumferential recess 38 (as shown in FIG. 9) configured to receive a spring clip 39. The helmet clip 3 has a cut out portion 40 for receiving the spring clip 39 so that the helmet pin 22 inserted inside the hollow portion 42 may be locked within. Once locked, the helmet pin may be disengaged by pulling out the spring clip 39 using its grip portion.

In order to disconnect the helmet 5 from the respective helmet clip 3, one must pull out the spring clip 39, from the cut out portion 40, and with a rotational movement pull the arm 1 over driver's head. The arm 1 will rotate (pivot) on the carrying shaft 7.

The embodiment of the helmet clip 3, shown in FIG. 10, allows for freedom of movement of driver's head within a safe range.

Figure 11:
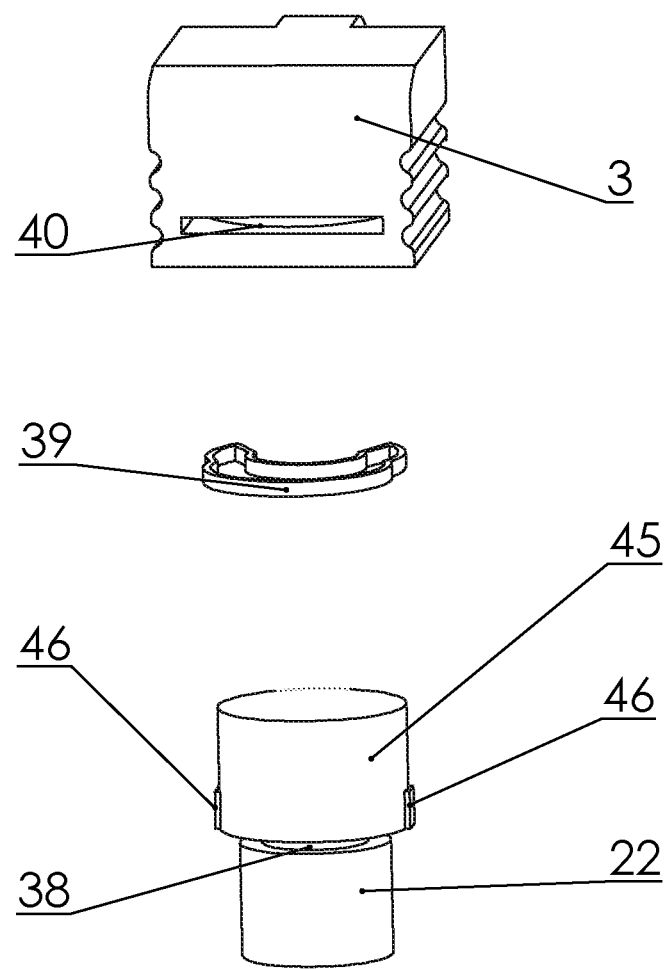
FIG. 11 shows an exploded view of the helmet clip with the helmet pin having a cylindrically-shaped portion.

FIG. 11 shows an exploded view of the helmet clip with the helmet pin 22 having a cylindrically-shaped portion 45. The cylindrically-shaped portion 45 is located at the top of the helmet pin 22 and comprises two, preferably opposite, protrusions 46 for engaging two respective cavities present in the helmet clip 3 (not shown on the drawing). The protrusions 46 and the cavities limit the rotational movement of the helmet pin 22 having the cylindrically-shaped portion 45.

Figure 12:
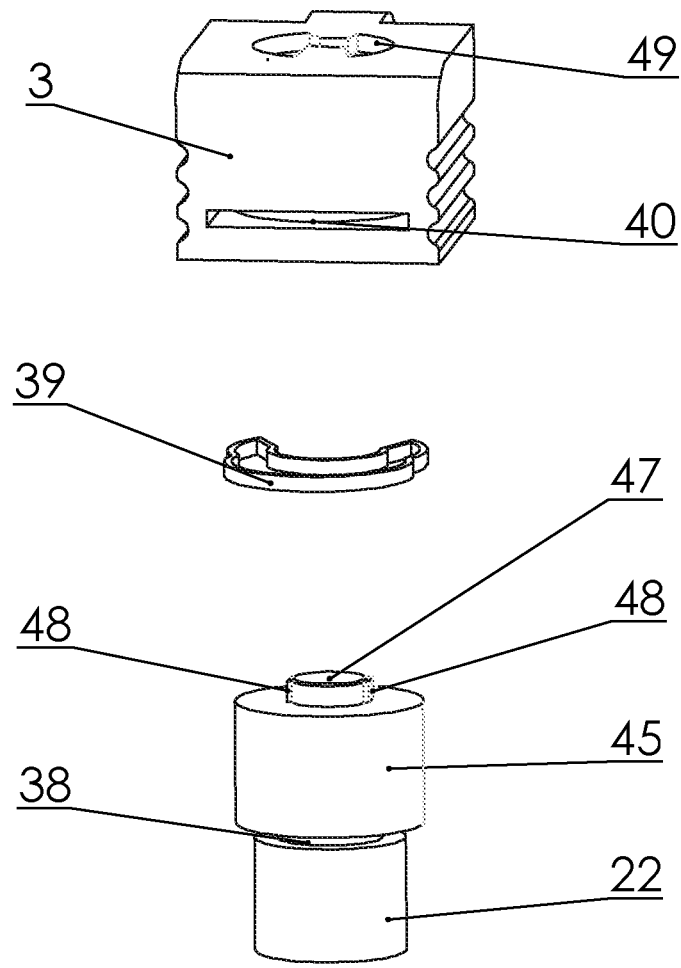
FIG. 12 presents an exploded view of the helmet clip with the helmet pin having a cylindrically-shaped portion, a disc top member and two opposite protrusions.

FIG. 12 presents an exploded view of the helmet clip 3 with the helmet pin 22 having a cylindrically-shaped portion 45, a disc top member 47 and two opposite protrusions 48 extending on the disc (as explained above, the number of such protrusions may vary). The disc top member 47 has preferably a lower diameter than the cylindrically-shaped portion 45.

The helmet clip 3 comprises, at its top, an opening with recesses 49 for receiving the disc top member 47 and the two opposite protrusions 48 extending on the disc top member 47. The protrusions 48 and the recesses, once engaged, limit the rotational movements of the helmet pin 22 having the cylindrically-shaped portion 45 with the disc top member 47.

The helmet pin 22 has, under the cylindrically-shaped portion 45, the circumferential recess 38 configured to receive a spring clip 39. The helmet clip 3 has a cut out portion 40 for receiving the spring clip 39 so that the helmet pin 22, inserted inside the hollow portion 42, may be locked within.

Once locked, the helmet pin 22 may be disengaged, from the helmet clip 3, by pulling out the spring clip 39, using its grip portion, from the cut out portion 40 and with a rotational movement pull the arm 1 over driver's head. The arm 1 will rotate (pivot) on the carrying shaft 7.

Figure 13:
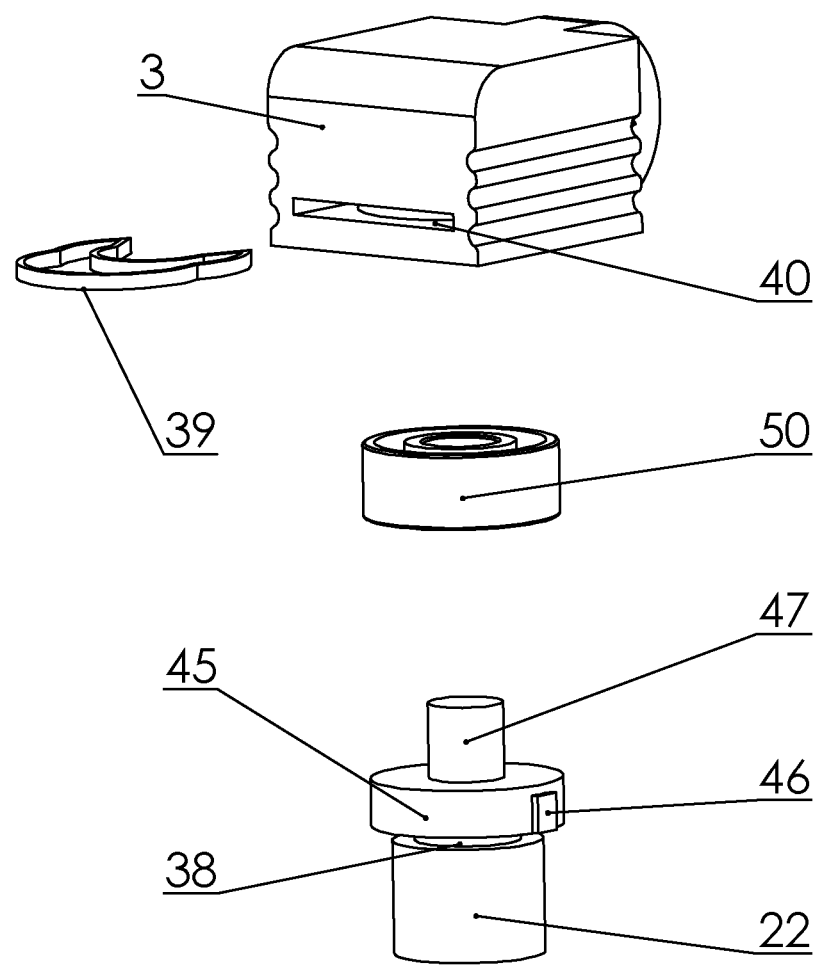
FIG. 13 depicts an exploded view of the helmet clip with the helmet pin having a cylindrically-shaped portion and a bearing.

FIG. 13 depicts an exploded view of the helmet clip 3 with the helmet pin 22 having a cylindrically-shaped portion 45 and a bearing 50. The bearing 50 is positioned within the hollow portion 42 of the helmet clip 3, which is configured to receive a disc top member 47 of the helmet pin 22.

The disc top member 47 has preferably a lower diameter than the cylindrically-shaped portion 45.

The cylindrically-shaped portion 45, present underneath the disc top member 47, has two, preferably opposite, protrusions 46 for engaging two respective cavities present within in the helmet clip 3 (not shown on the drawing).

The protrusions 46 and the respective cavities, limit the rotational movement of the helmet pin 22 having the cylindrically-shaped portion 45 and the disc top member 47.

Figure 14:
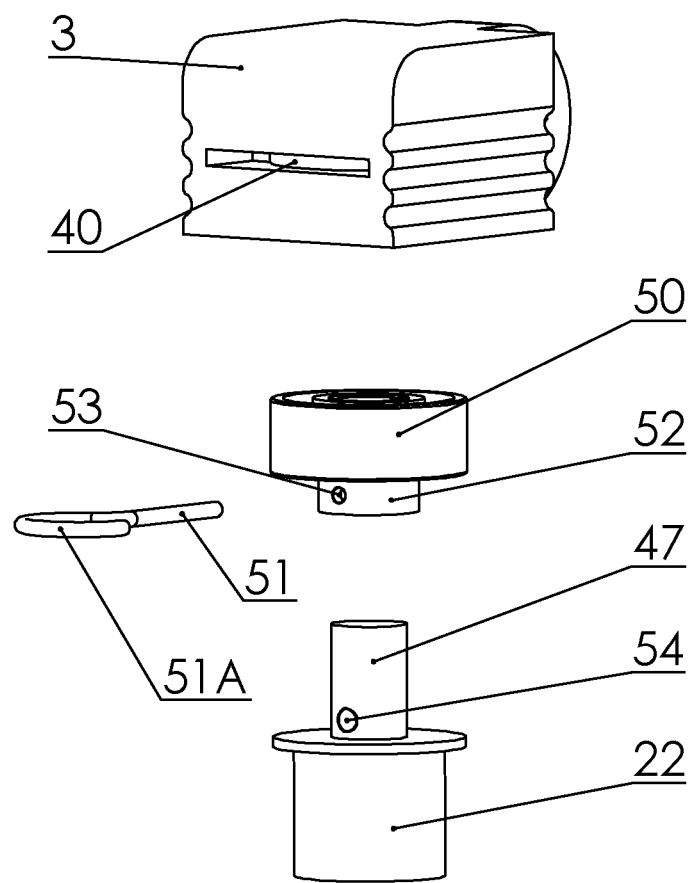
FIG. 14 shows an exploded view of the helmet clip with the helmet pin having a cylindrically-shaped portion, the bearing and an opening for receiving a cap.

FIG. 14 shows an exploded view of the helmet clip 3 with the respective helmet pin 22 having a disc top member 47, the bearing and an opening for receiving a cap. In this embodiment, instead of the spring clip 39 there is employed a rod-like stopper 51.

In order for the rod-like stopper 51 to block the helmet pin 22 in the corresponding helmet clip 3, the disc top member 47 comprises a cavity 54 for receiving a portion of the rod-like stopper 51, wherein further the bearing 50 has, in its bottom portion, a horizontal through hole 53 (in a wall of its bottom section), matching the cavity 54. Therefore, the rod-like stopper 51, inserted via the cut out portion 40, passes via the horizontal through hole 53 and enters the cavity 54 thereby blocking the helmet pin 22 in the helmet clip 3.

The cut out portion 40, in which the rod-like stopper 51 is inserted, limits a rotational movement of the helmet pin 22 and allows for freedom of movement of driver's head within a safe range.

To this end, the rod-like stopper 51 may have a wider ending or a bent portion 51A, configured to operate as a grip portion, as shown in FIG. 13.

Figure 15:
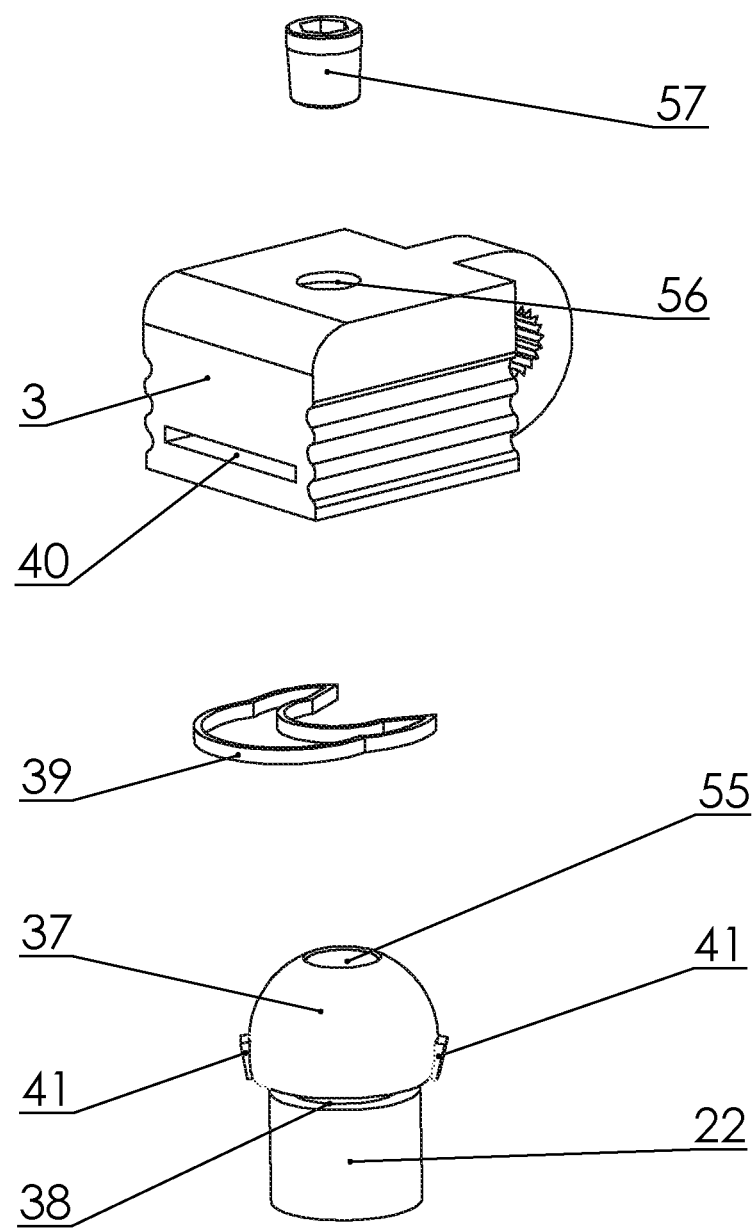
FIG. 15 shows an exploded view of the helmet clip with the helmet pin having a spherically-shaped portion and an opening, in the spherical portion, for receiving a locking member.

FIG. 15 shows an exploded view of the helmet clip 3 with the helmet pin 22 having a spherically-shaped portion 37 and an opening 55, in the top section of the spherical portion 37, for receiving a locking member 57. The opening 55, preferably has a horizontal diameter and receives the locking member 57 in a vertical direction (axis).

The spherically-shaped portion 37 further comprises at least one protrusion (preferably two, opposite each other) 41 for engaging respective at least one cavity present in the helmet clip 3 (not shown on the drawing).

The helmet clip 3, has in its top portion a substantially center opening 56 for receiving the locking member 57, which also engages the opening 55, in the top of the spherical portion 37.

The helmet pin 22 has, under the spherically-shaped portion 37, the circumferential recess 38 configured to receive a spring clip 39. The helmet clip 3 has a cut out portion 40 for receiving the spring clip 39 so that the helmet pin 22, inserted inside the helmet clip 3, may be locked within.

Once locked, the helmet pin 22 may be disengaged, from the helmet clip 3, by pulling out the spring clip 39, using its grip portion, from the cut out portion 40 and with a rotational movement pull the arm 1 over driver's head. The arm 1 will rotate (pivot) on the carrying shaft 7.

Figure 16:
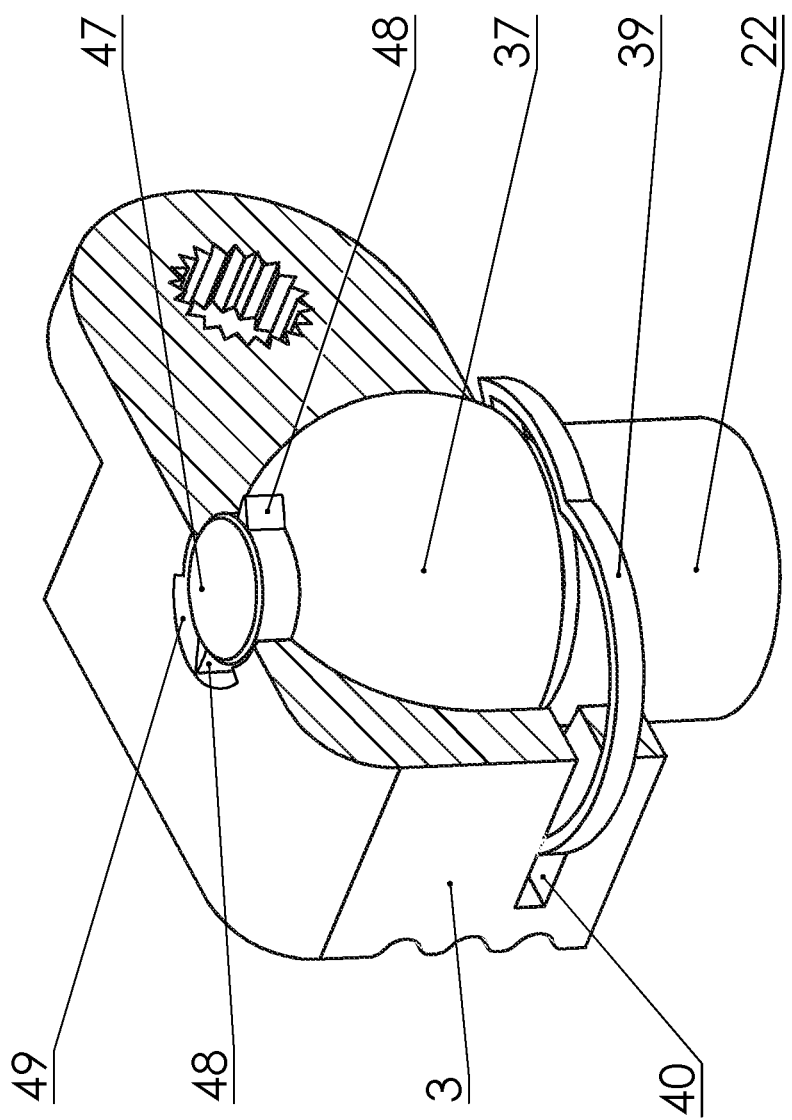
FIG. 16 presents a cross-section of the helmet clip having an inserted helmet pin comprising the spherically-shaped portion with the disc top member and two opposite protrusions.

FIG. 16 presents a cross-section of the helmet clip 3 having an inserted helmet pin 22 comprising the spherically-shaped portion 37 with the disc top member comprising two opposite protrusions 48.

Two opposite protrusions 48 are preferred due to stability and equal distribution of forces, but there may be embodiments where the protrusions 48 are not opposite each other and where there is only one or more than two protrusions serving the same purpose.

The helmet clip 3 comprises an opening 49 (preferably having a horizontal diameter) with cavities for receiving the corresponding two opposite protrusions 48, which also act as rotation limiters of the helmet pin 22.

The helmet pin 22 has, under the spherical member 47, the circumferential recess 38 (as previously shown in FIG. 15) configured to receive a spring clip 39. The helmet clip 3 has a cut out portion 40 for receiving the spring clip 39 so that the helmet pin 22, inserted inside the hollow portion of the helmet pin 3, may be locked within.

Once locked, the helmet pin 3 may be disengaged by pulling out the spring clip 39, using its grip portion, from the cut out portion 40 and with a rotational movement pull the arm 1 over driver's head. The arm 1 will rotate (pivot) on the carrying shaft 7.

Figure 17:
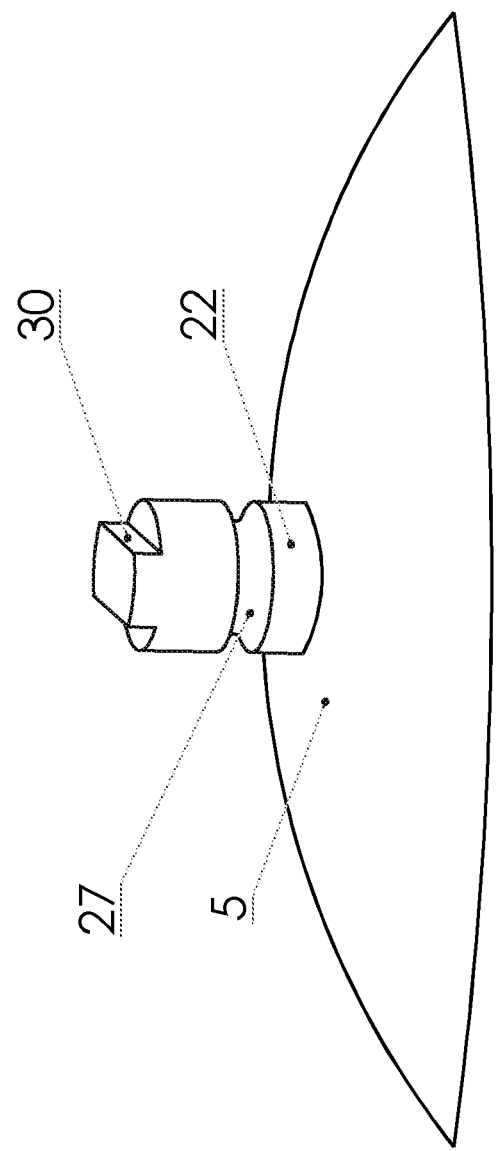
FIG. 17 depicts the helmet pin mounted on the helmet.

FIG. 17 depicts the helmet pin 22 mounted on the helmet 5. As previously shown in FIG. 2, the helmet pin 22 comprises the circumferential groove 27, for receiving a clamp ring 28, and has the delimiting protrusion 30 located at its top. The element pin 22 may be mounted on the helmet 5 using any techniques known in the art. In this embodiment the connection is not releasable.

Figure 18:
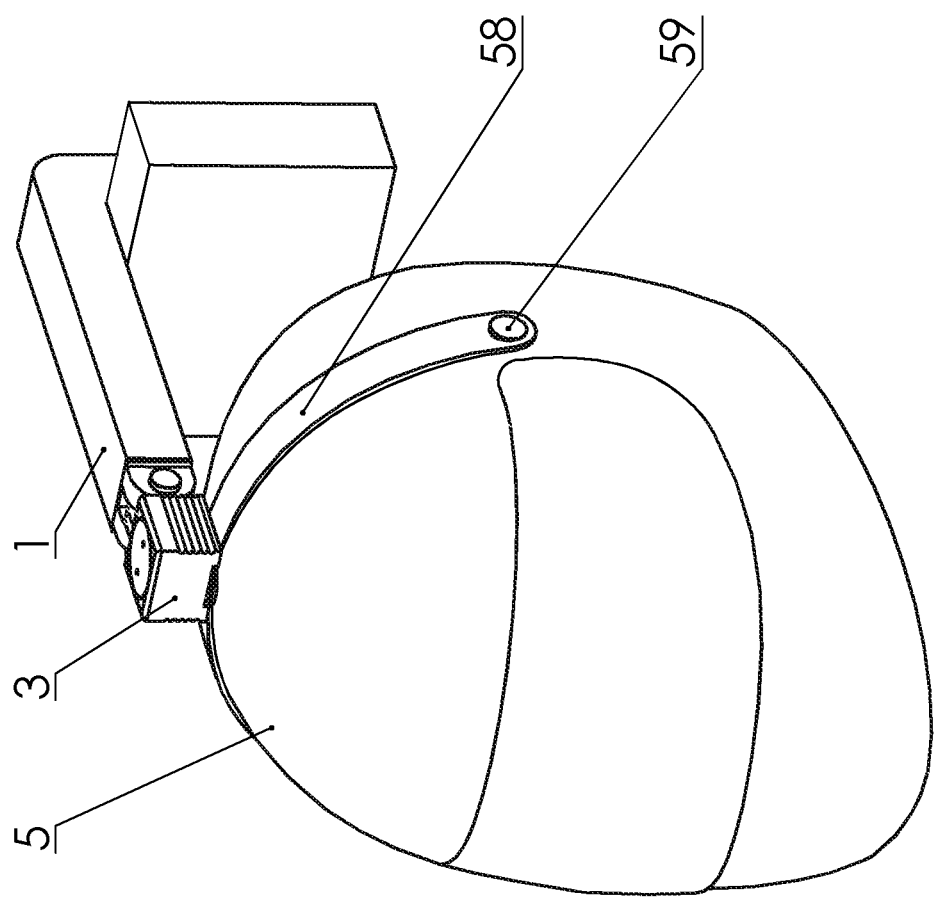
FIG. 18 shows an embodiment of the present invention in which the helmet pin is connected to a clamp pivotably mounted on the helmet.

FIG. 18 shows an embodiment of the present invention in which the helmet pin 22 is connected to a clamp 58 pivotably mounted on the helmet 5. This embodiment provides improved stability of the helmet 5 and may be releasable depending on the kind of the connection 59 of the clamp 58 to the helmet 5. In a preferred embodiment the connection 59 is made with rivets on left and right side of the helmet 5.

Figure 19:
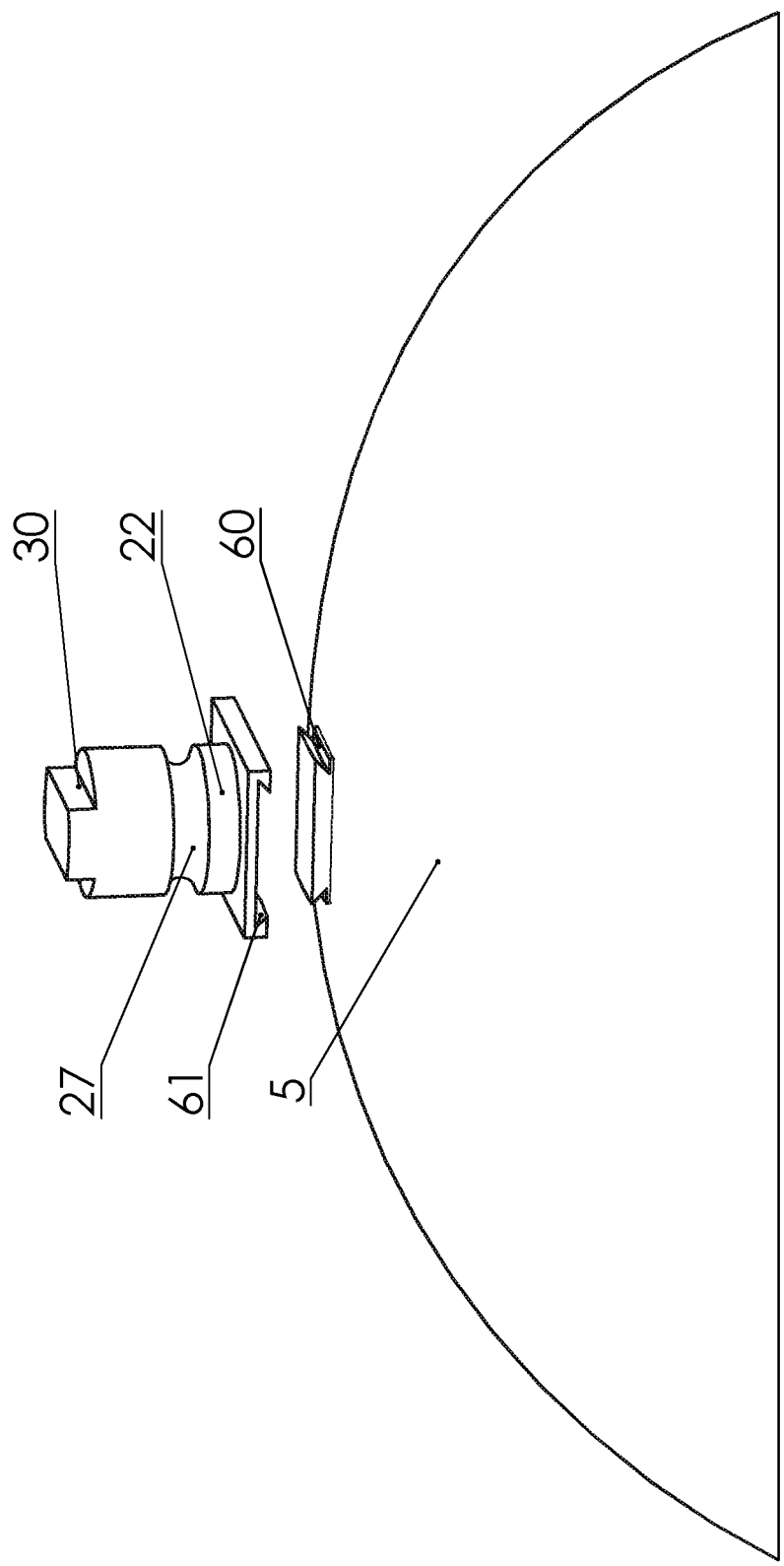
FIG. 19 presents an embodiment of the present invention in which the helmet pin is releasably fixed to a guide connected to the helmet.

FIG. 19 presents an embodiment of the present invention in which the helmet pin 22 is releasably fixed 61 to a guide 60 connected to the helmet. A slider element 61 is fixed to the guide 60. This embodiment provides improved stability of the helmet 5 and is releasable.

Figure 20:
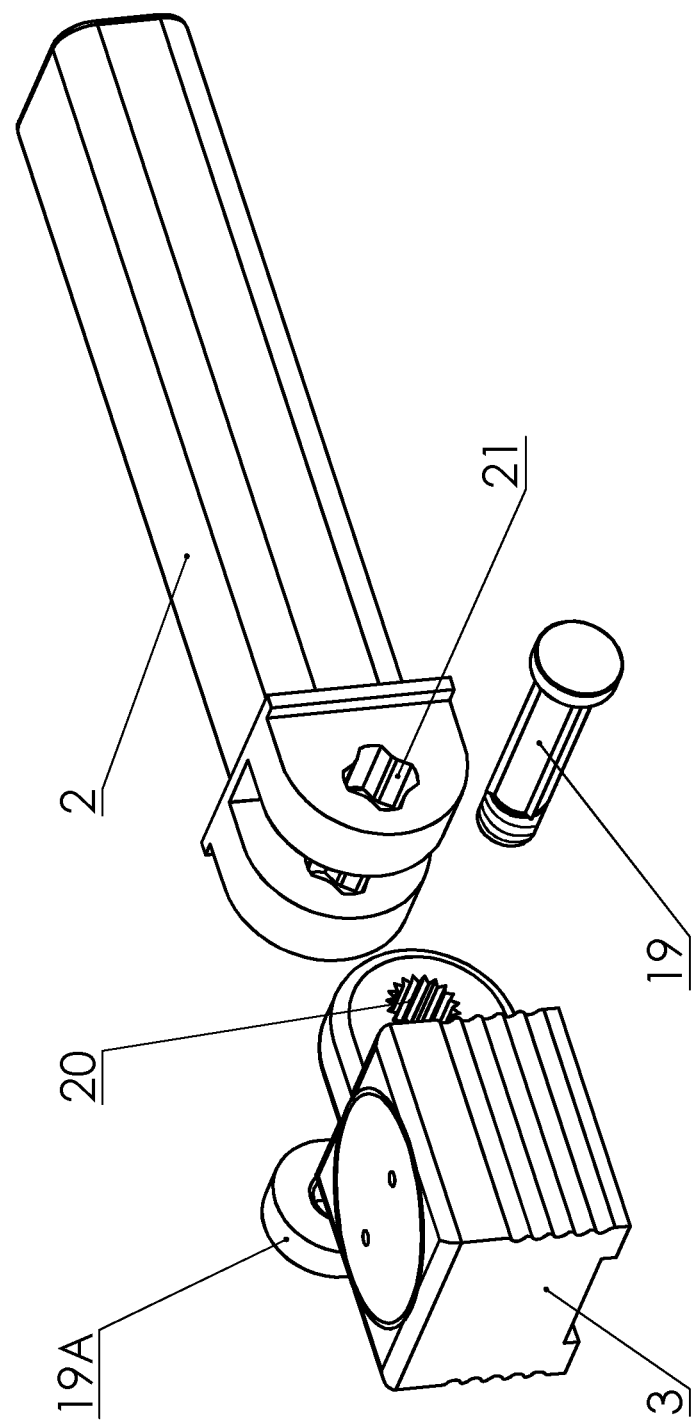
FIG. 20 depicts the helmet clip and the slidably-mounted element in an embodiment comprising a four-teeth bolt.

FIG. 20 depicts the helmet clip 3 and the slidably-mounted element 2 in an embodiment comprising a four-teeth bolt 19. Additionally, the opening(s) 21 in the slidably-mounted element 2 also are corresponding four-teeth openings for receiving the four-teeth bolt 19. Preferably, the width of the teeth of the opening(s) 21 is greater than the width of the teeth of the bolt 19.

Further, the ear mount of the helmet clip 3 has its opening 20 with a plurality of teeth, e.g. 16. This arrangement allows for more flexibility when a nodding movement is concerned.

Figure 21:
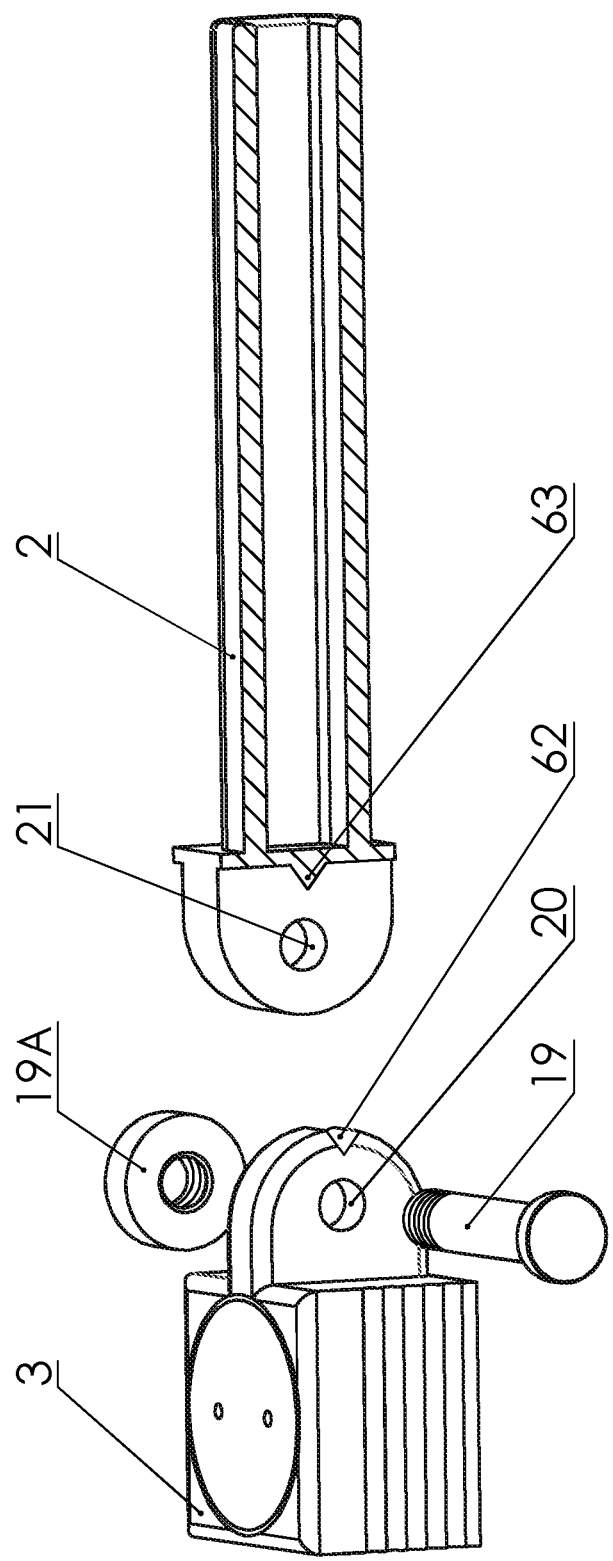
FIG. 21 shows the helmet clip and the slidably-mounted element in an embodiment comprising a protrusion in a seat of the helmet clip.

FIG. 21 shows the helmet clip 3 and the slidably-mounted element 2 in an embodiment comprising a protrusion 63 in a seat, of the helmet clip 3, located between the two ears comprising respective openings 21 being configured to receive the bolt 19.

The ear of the helmet clip 3 comprising the opening 20 also has a recess 62 corresponding to the protrusion 63 so that it may be engaged in an assembled state. As previously explained the bolt is received perpendicularly to the length of the longer section of the arm 1.

In this embodiment neither the openings 20, 21 nor the corresponding bolt 19 have any teeth.

Figure 22:
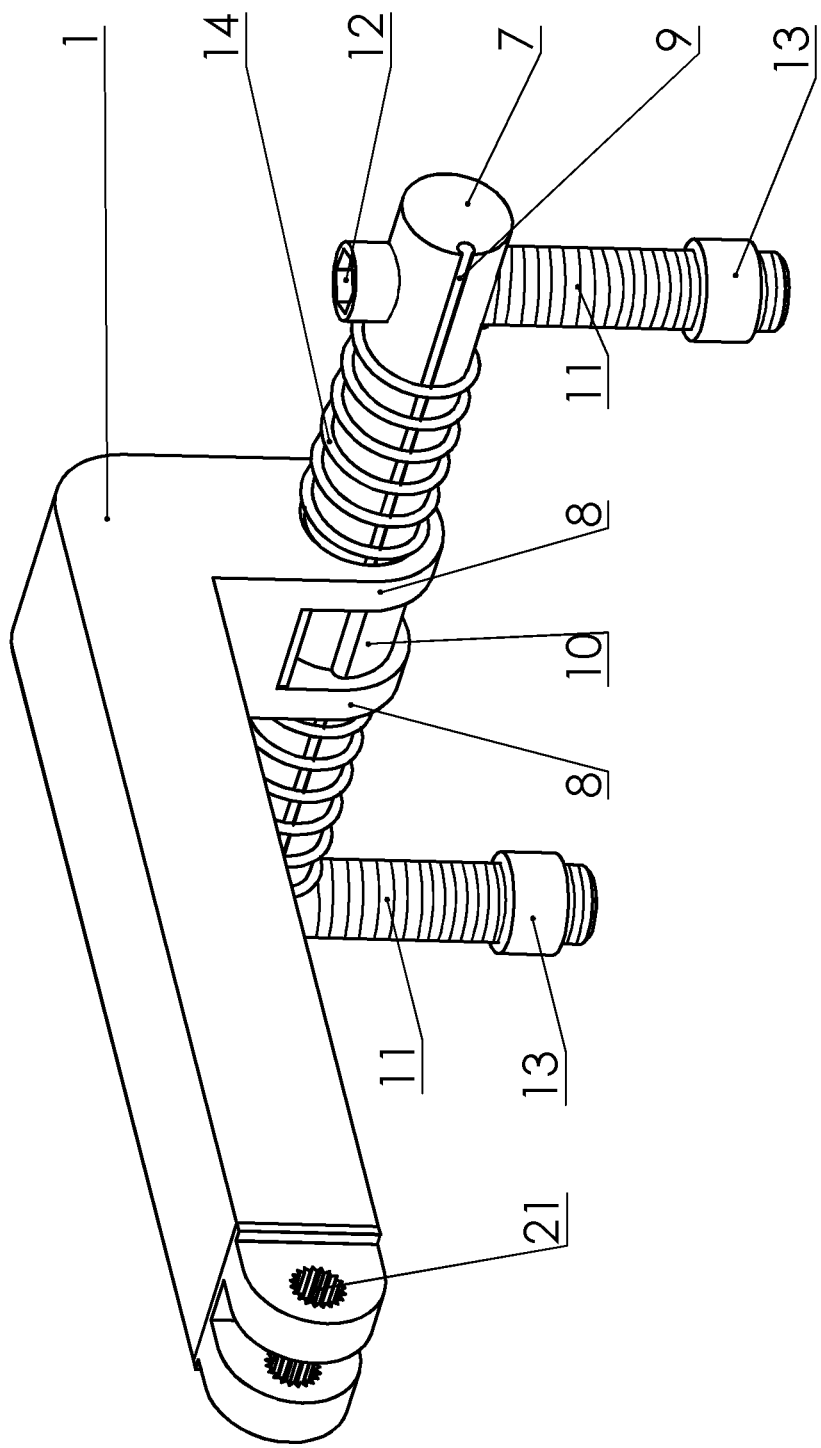
FIG. 22 presents the arm assembled on the carrying shaft.

FIG. 22 presents the arm 1 assembled on the carrying shaft 7 as previously shown in FIG. 2 as disassembled elements view. The carrying shaft 7 comprises a groove 9, in which one end of the spring element 10 is positioned.

The spring element 10 partly surrounds the carrying shaft 7 (preferably to the extent allowed by the hollow section in the mounting element) while the other end 10B of the spring element 10 adheres, with its flat surface, to the arm 1 between the two arms 8 as shown in FIG. 2. The flat surface acts like a spring thereby achieving the helmet's weight neutralizing function as explained with reference to FIG. 2.

Figure 23:
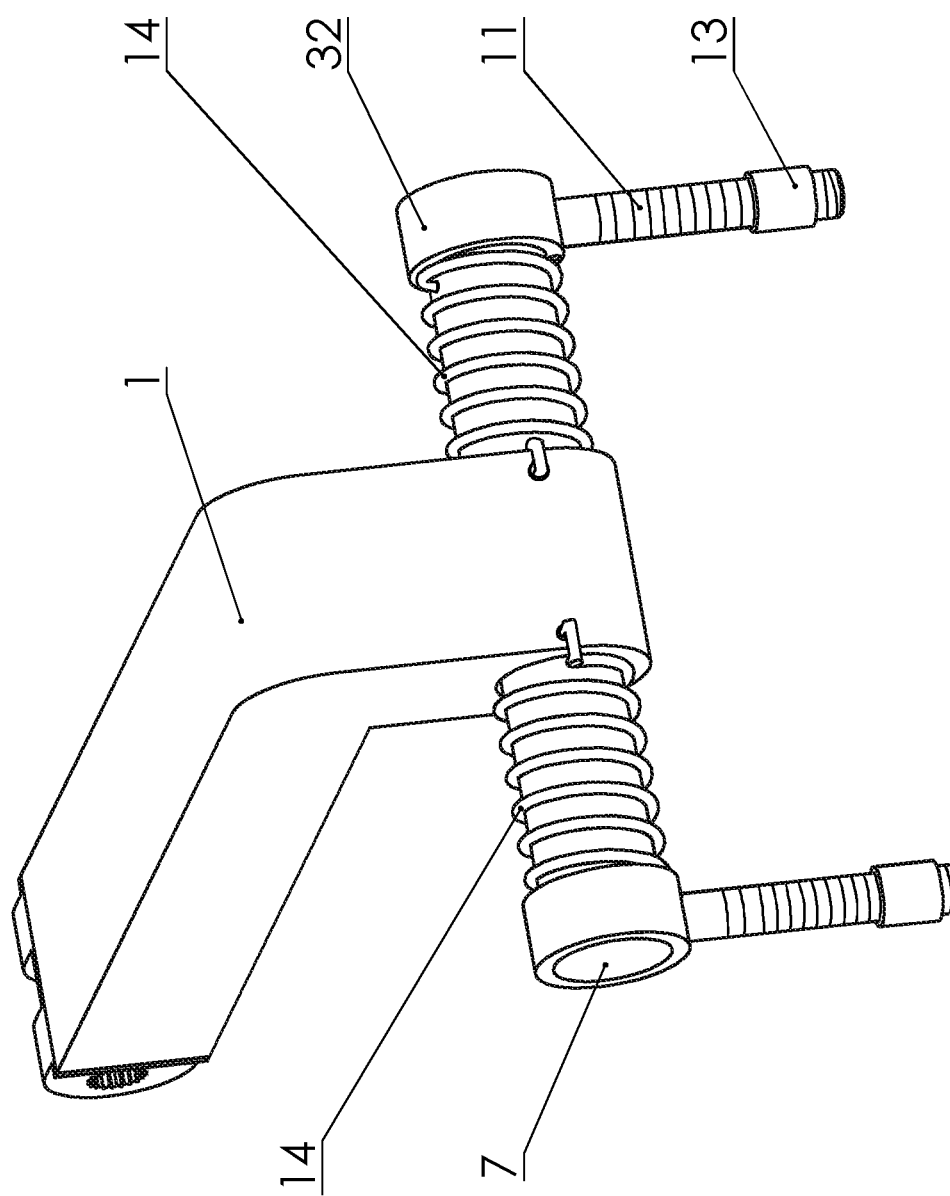
FIG. 23 depicts a back view of the arm assembled on the carrying shaft wherein the helical springs are fixed to the arm with their respective ends directed towards the arm.

FIG. 23 depicts a back view of the arm 1 assembled on the carrying shaft 7 wherein the helical springs 14 are fixed (for example anchored) to the arm 1 with their respective ends directed towards the arm 1. The other ends of the helical springs (the far ends) may be releasably fixed to the carrying shaft 7. Alternatively, other ends of the helical springs (the far ends) may be releasably fixed to respective left and right bushes 32 configured to receive the ends of the carrying shaft 7. In such an embodiment, the carrying shaft 7 does not comprise, at its ends, the threaded openings 7B, in which there may be positioned the threaded mandrels 11, as shown in FIG. 2. Instead, the threaded mandrels 11 are rather fixed to the left and right bushes 32 respectively.

Figure 24:
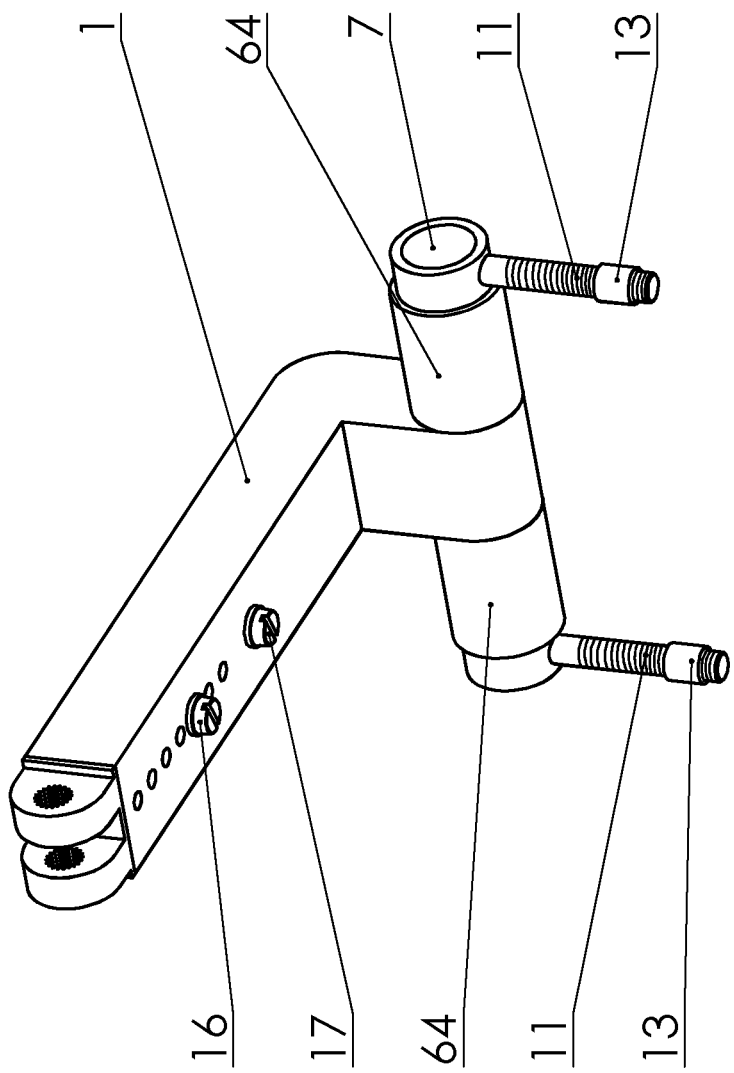
FIG. 24 shows a bottom view of the arm assembled on the carrying shaft wherein the carrying shaft has absorbing elements mounted thereon instead of the helical springs.

FIG. 24 shows a bottom view of the arm 1 assembled on the carrying shaft 7 wherein the carrying shaft has energy absorbing elements 64 mounted thereon instead of the helical springs 14. The energy absorbing elements 64 may be made from a CONFOR foam.

FIG. 25 presents a lengthwise cross section of the arm 1 comprising bearings elements 18. The bearings elements 18 are preferably located on all four sides of the hollow portion of the longer section of the arm 1.

As already explained with reference to FIG. 2, there are bars comprising bearing elements 18 facilitating movement of the slidably-mounted element 2 within the hollow portion of the longer section of the arm 1.

Alternatively, between engaging planes of the arm 1 and the slidably-mounted element 2, there is a friction reducing agent, preferably a suitable lubricant or a Teflon layer.

Figure 26:
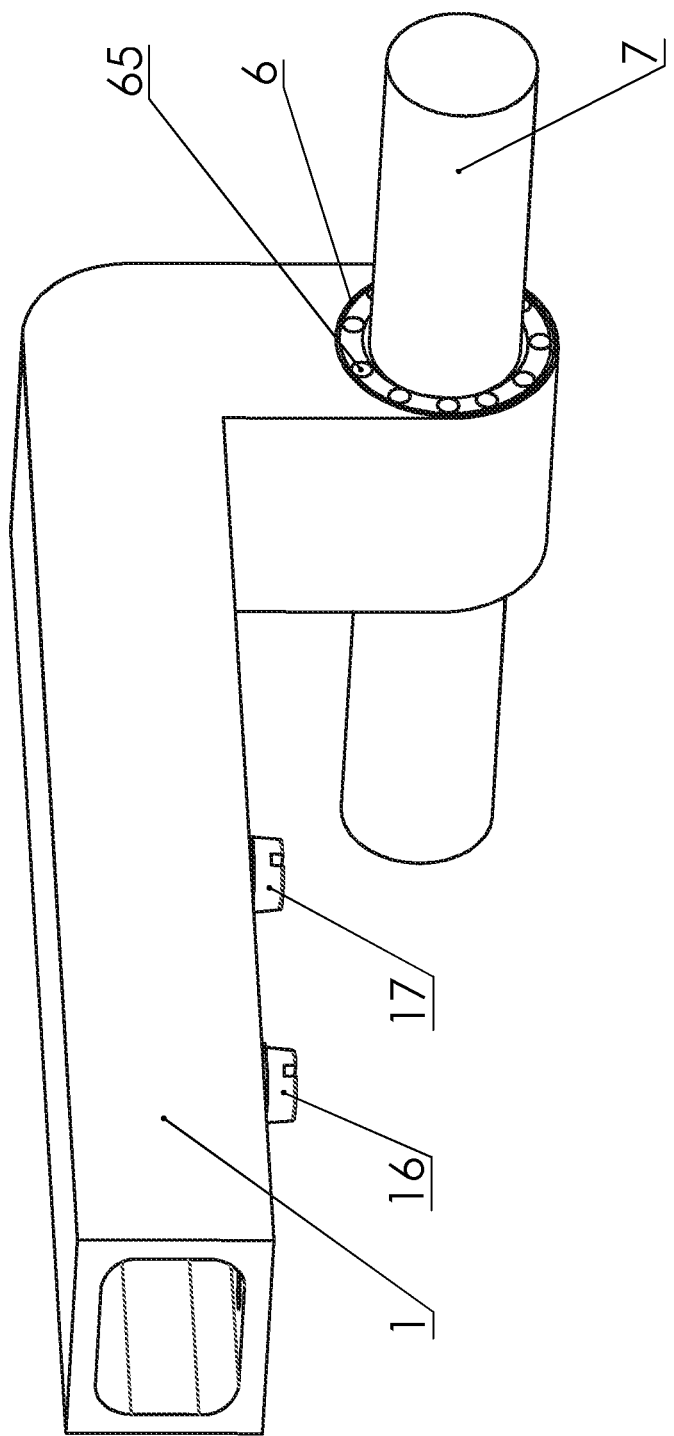
FIG. 26 depicts a view of the arm with a carrying shaft being mounted in a bearing.

FIG. 26 depicts a view of the arm 1 with a carrying shaft 7 being mounted in a bearing 65. The bearing 65 is mounted in the opening 6, positioned in an axis perpendicular to the length of the arm 1. The bearing 65 facilitates a more smooth pivot around the carrying shaft 7.

Figure 27:
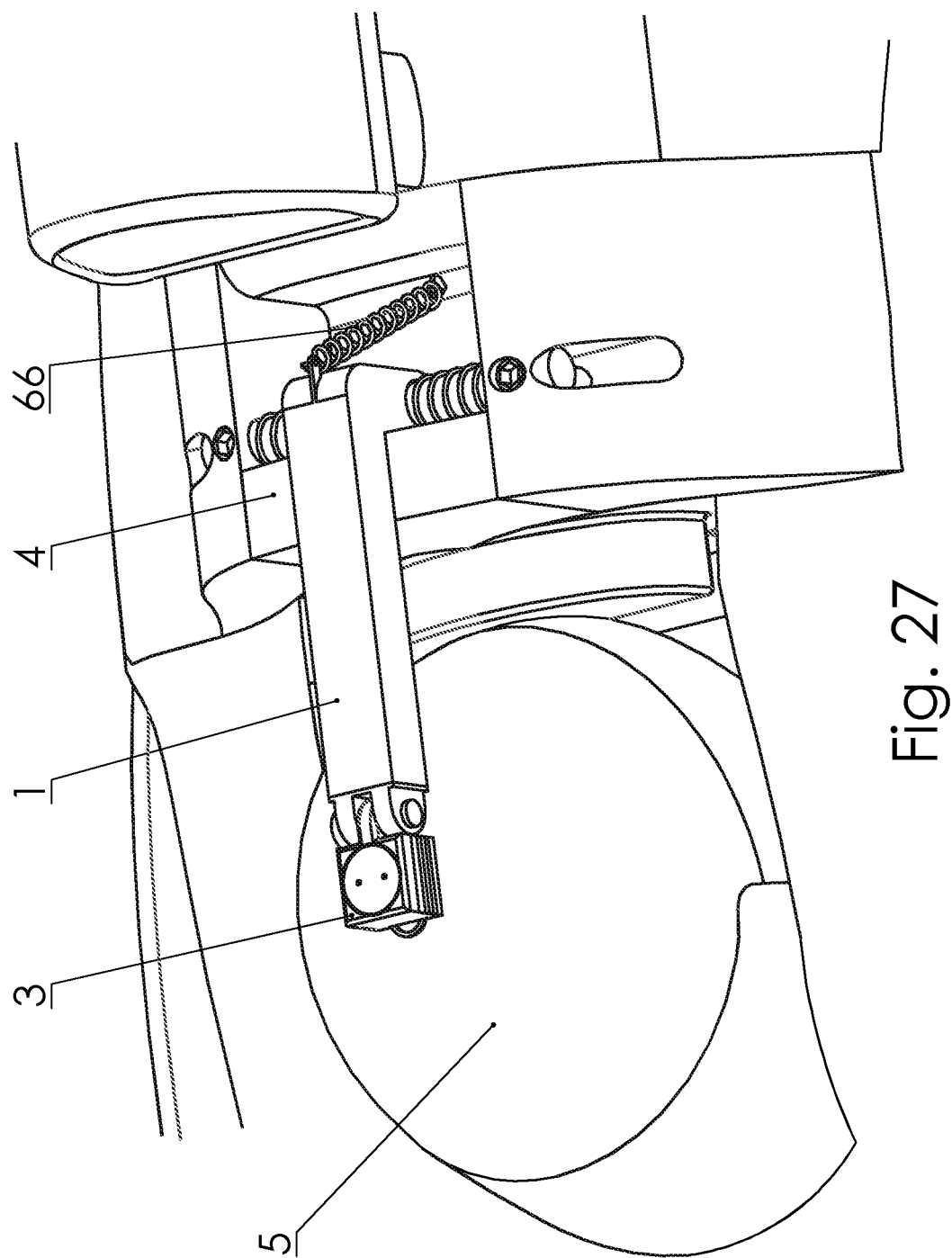
FIG. 27 presents a section of a formula car having the arm connected to its chassis by means of an additional spring.

FIG. 27 presents a section of a formula car having the arm 1 connected to its chassis by means of an additional spring 66. The function of the spring is to allow easier release of the helmet clip 3 and keeping the opened arm 1 above the helmet 5 to avoid hitting the helmet pin 22 with an opened helmet clip 3. Further, the spring 66 compensates the weight of the device and the attached helmet 5, which as previously described allows for more comfort and makes it possible to use heavier and safer helmets 5.

Figure 28:
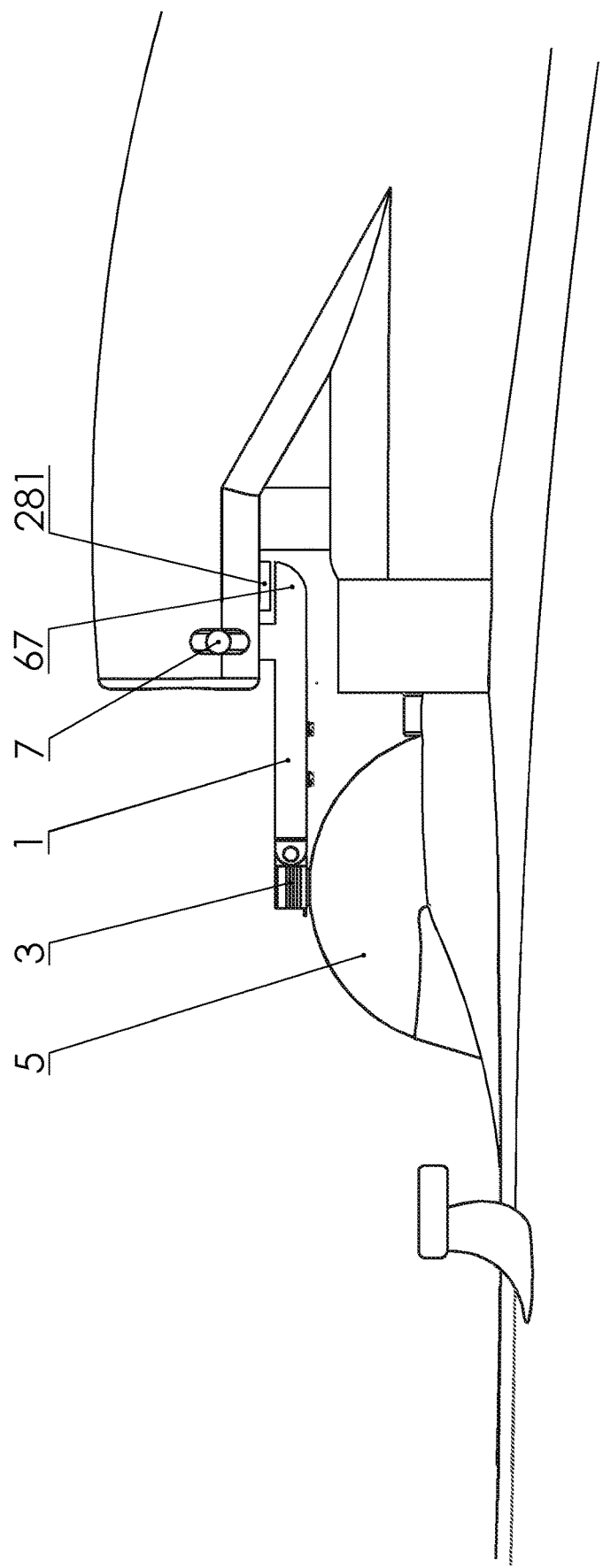
FIG. 28 shows a section of a formula car having the arm connected to its chassis wherein the arm has an additional counterweight with respect to vertical movements of the helmet.

FIG. 28 shows a section of a formula car having the arm 1 connected to its chassis wherein the arm 1 has an additional counterweight 67 with respect to vertical movements of the helmet 5. The purpose of the counterweight 67 is the same as in case of the spring 66.

Further, element 281 may act also as a blocking block for the device according to the present invention, in case the helmet is pushed downwards.

FIG. 29 depicts the arm 1 having an additional damping element 68 engaging the resistance block 4. Said damping element 68 decreases the pressure of the arm on the driver's head and eliminates rapid impacts of the arm 1 on the resistance block 4 in case of a collision of the helmet 5 with a flying object or hitting a safety fence by the formula car.

Figure 30:
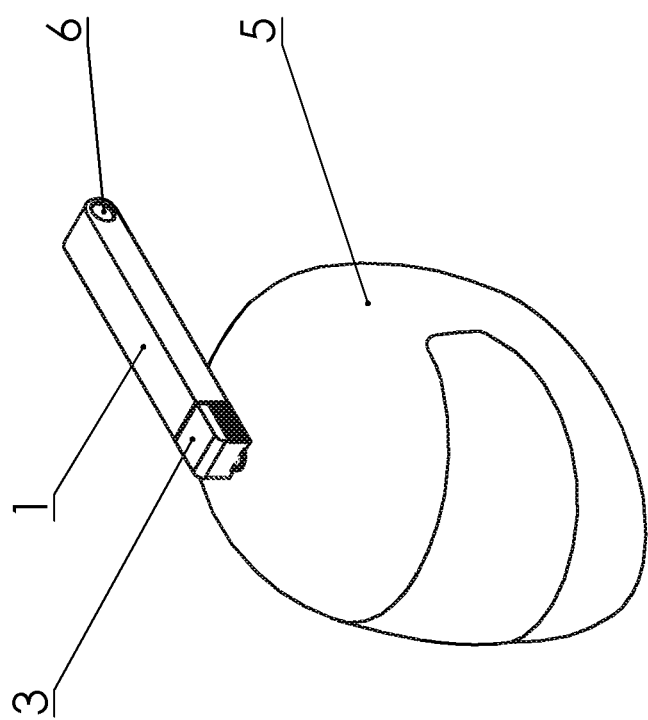
FIG. 30 presents an embodiment of the arm having an I-shape.

FIG. 30 presents an embodiment of the arm 1 having an I-shape. A typical length of the arm 1 is first determined by the slidably-mounted element 2 and secondly by the construction of the formula car. Typically, the length will be greater than 10 cm but may extend beyond 20 cm. In a preferred embodiment the arm 1 has a length between 10 cm and 15 cm.

In this case the end of the arm, further away from the helmet clip 3, ends directly with an opening 6 for receiving the carrying shaft 7. Additionally, in this embodiment the bolt 19 connecting suitable elements (20, 21) of the slidably-mounted element 2 and the helmet clip 3 is not present and the slidably-mounted element 2 ends directly with the helmet clip. Such an embodiment further reduces the weight of the device.

Figure 31:
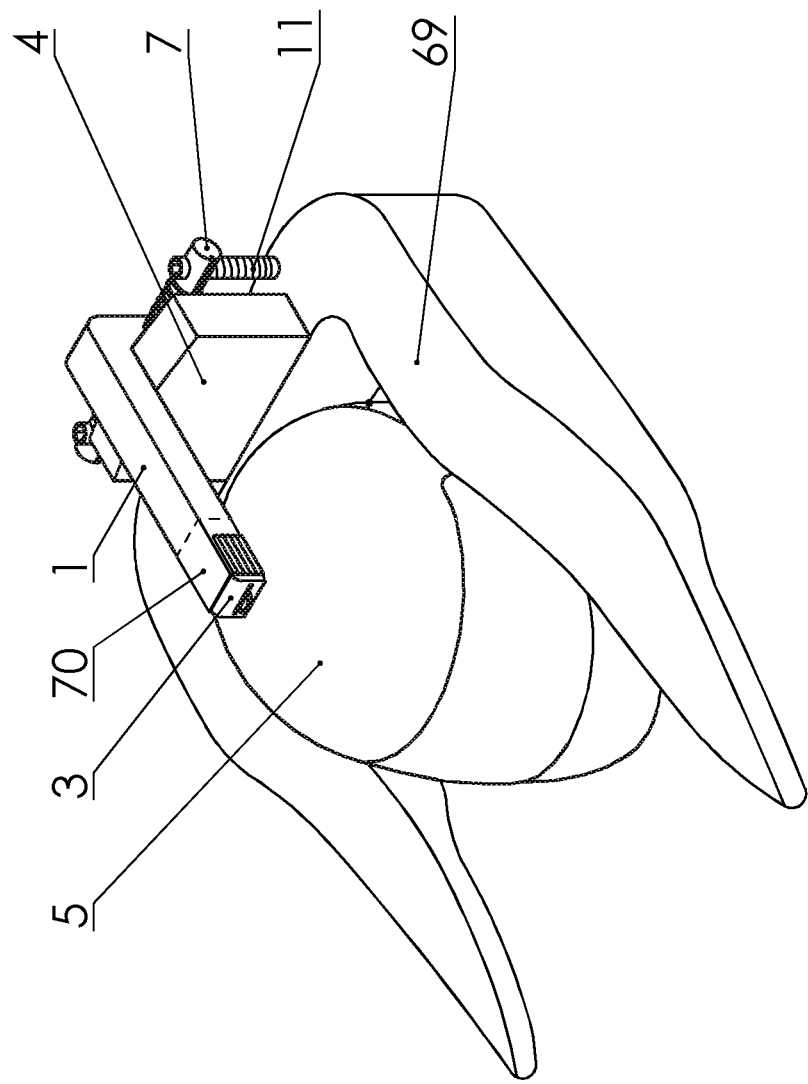
FIG. 31 shows the device according to the present invention mounted on a shell surrounding a driver's helmet whereas the shell is fixed to the chassis of the vehicle.

FIG. 31 shows the device according to the present invention mounted on a shell 69 surrounding a driver's helmet 5 (when a driver takes a driving position) whereas the shell 69 is fixed to the chassis of the vehicle. Further, the arm 1 comprises a protective element configured to protect the helmet clip 3 from damage.

Figure 32:
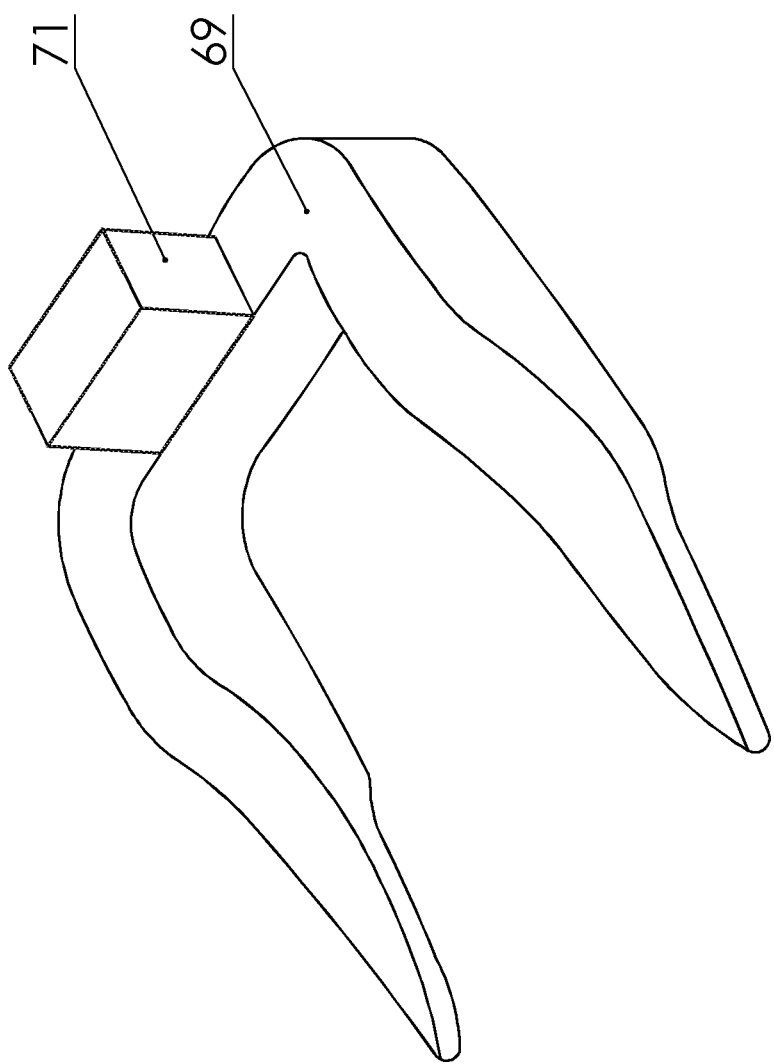
FIG. 32 depicts the shell comprising the resistance block.

FIG. 32 depicts the surrounding shell 69 comprising a resistance block 71. The resistance block 71 is the same as the resistance block 4 with a difference lying in the location of its mounting. The resistance block 4 is mounted on the chassis of the formula car while the resistance block 71 is mounted on the surrounding shell 69. In both cases the resistance block 4, 71 is configured to transfer energy into the chassis when the arm 1 hits the resistance block 4, 71 from above.

Preferably, in all embodiments, between engaging surfaces (of any two components such as the arm 1 and the carrying shaft 7) there is a friction reducing agent such as a suitable lubricant or a Teflon layer.

As evident from the embodiments shown above, the improved and cost effective Head and Neck Support And Protection device, also protects the head from impacts from the top as well as provides the support function.

During an impact of the attached helmet 5, for example with a debris from a crash, the present invention provides an improved protection by appropriately transferring forces from the elements impacting the helmet into the described device and further to the chassis of the vehicle.

In this way the forces acting on the helmet, and thus the head and neck of the driver, become neutral. By prohibiting or restricting head movement in x and y planes (i.e. parallel and perpendicular to the length of the vehicle's chassis) being implemented with springs, dampers as well as the protective pin 17, there may be used heavier helmets (having improved protection) the mass of which will be neutralized.

Figure 33:
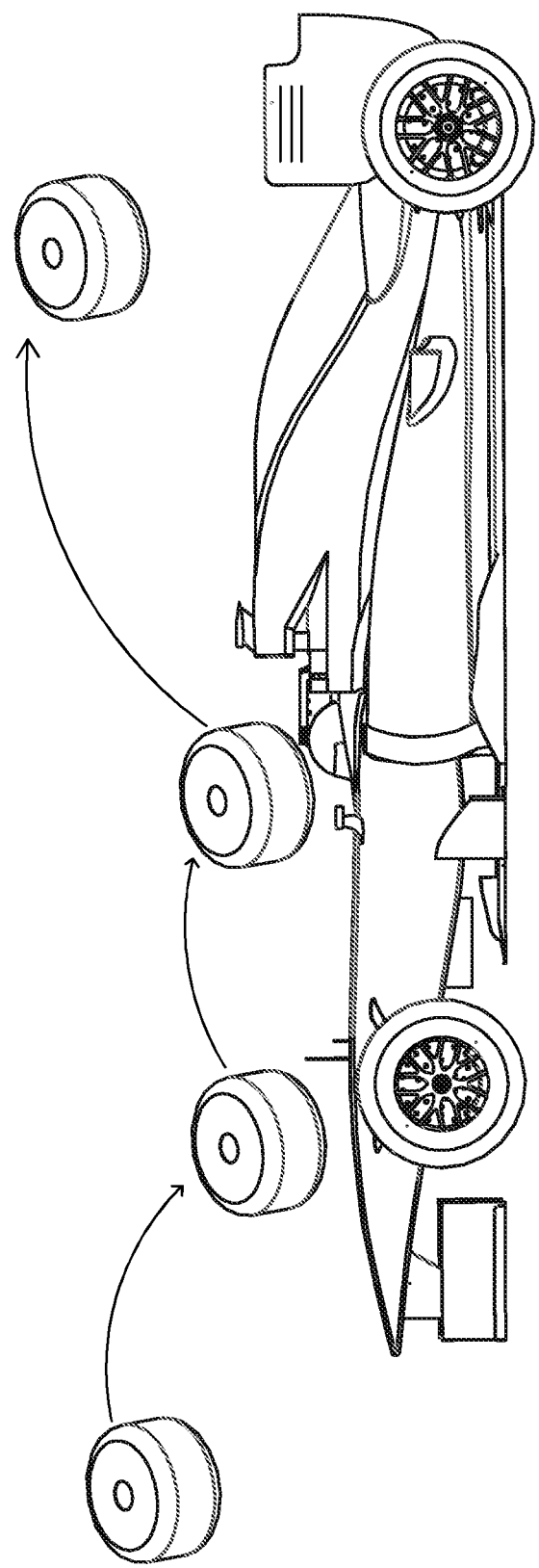
FIG. 33 presents a process of an impact of a wheel into the system according to the present invention.

FIG. 33 presents a process of an impact of a wheel into the system according to the present invention. In such case the driver's helmet may only slightly move left-right as allowed by rotation limiters (within a safe range) or may move slightly downwards (for example in case of an embodiment shown in FIG. 29 (within a safe range).

In case of an impact into a safety fence, the slidably-mounted element 2, at the foremost end of which there is mounted the helmet clip 3 attached to a helmet 5, moves forward (in a linear fashion), together with the body of a driver in order to prevent injuries to the neck.

In the above case, then the head would be fixed in a given position, the neck could suffer an injury because the remaining parts of the driver's body would inevitably move while the head remains in a fixed position.

In turn, during side impact, the helical spring 14 will decrease forces acting on the head and will protect from injuries in such cases.

Figure 34:
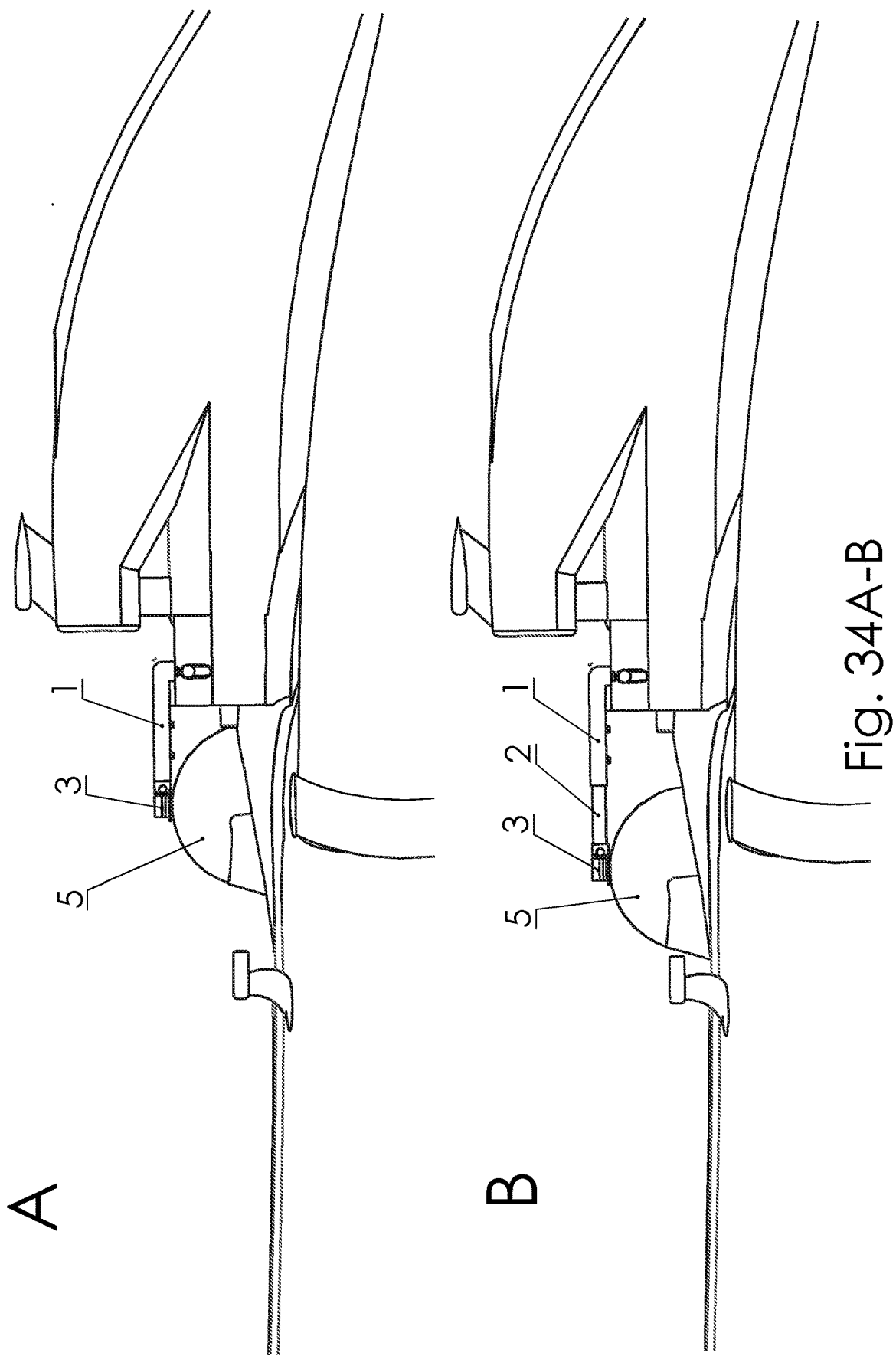
FIGS. 34A-B show a process of reaction of the system according to the present invention, to an impact into a safety fence.

FIGS. 34A-B show a process of reaction of the system according to the present invention, to an impact into a safety fence. In FIG. 34B the slidably-mounted element 2 has extended, to its maximum allowed range, thus preventing injuries to the neck.

Figure 35:
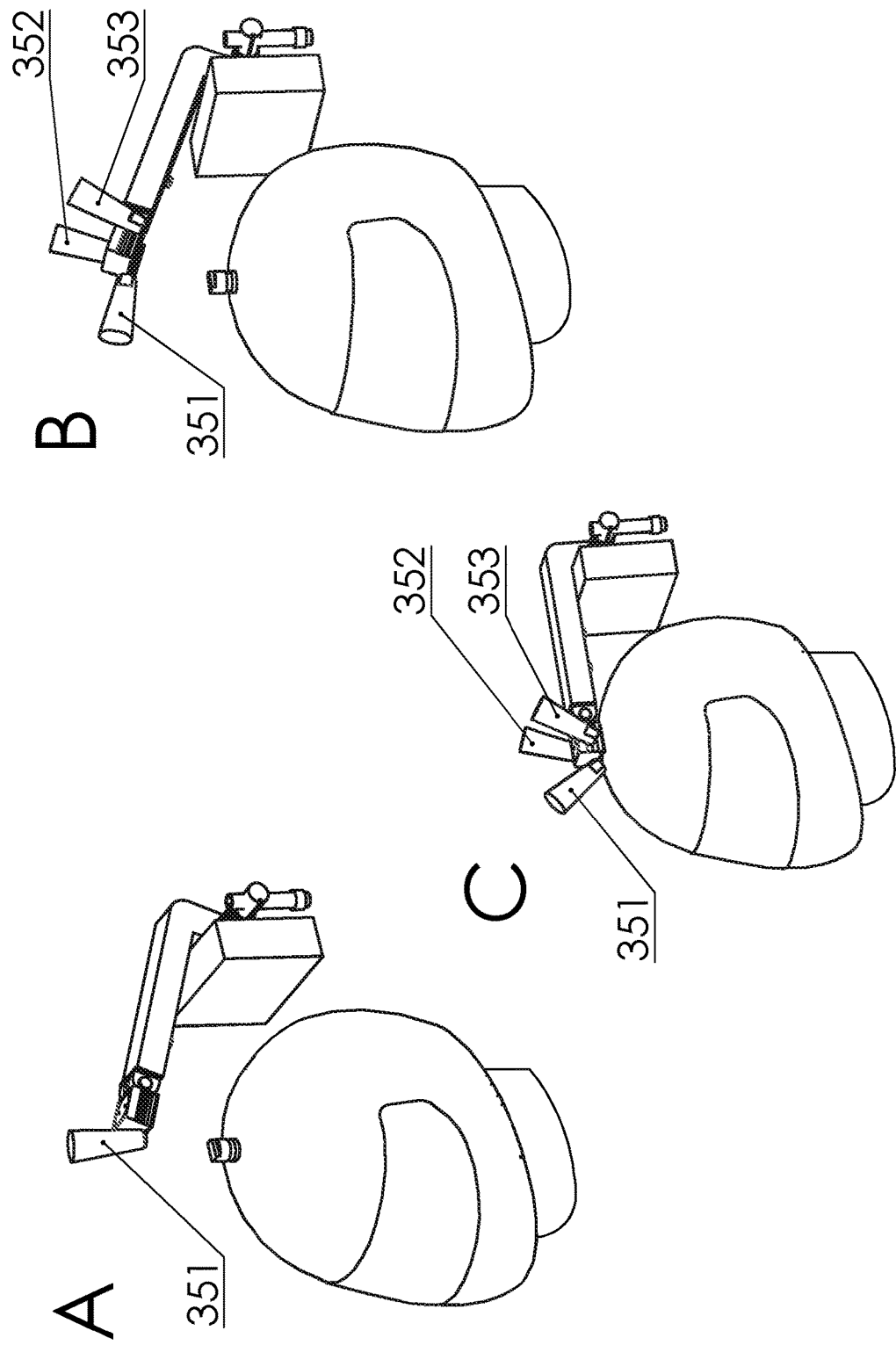
FIGS. 35A-C depict a process of installing and attaching a helmet to the system according to the present invention.

FIGS. 35A-C depict a process of installing and attaching a helmet to the system according to the present invention. This series of steps show an embodiment of the present invention presented with relation to FIG. 7.

In FIG. 35A, after a driver has taken a seat in the formula car, the device remains open (as shown in FIG. 1A) and a person (be it the driver or a support team member) holds the grip 29 of the clamp ring 28 with the index finger 351. Next, as shown in FIG. 35B, with the index finger 352 of the other hand and the thumb 353 one pulls the helmet clip 3 up, which results in loosening the blocking balls 26, present in respective openings in the head 23, that fall into the recess (see helmet clip 3 in FIG. 8) in the helmet clip 3.

In this manner the helmet pin 22 may be inserted into the helmet clip 3. The connection operates as a so called quick release system.

Lastly, as shown in FIG. 35C, the arm 1 is pulled downwards connecting the helmet clip 3 to the helmet pin 22 still holding the helmet clip 3 and the grip 29 as previously shown. Once the helmet clip 3 engages the helmet pin 22 the fingers, holding the respective elements, may be released. Then the blocking balls 26 are locked.

Figure 36:
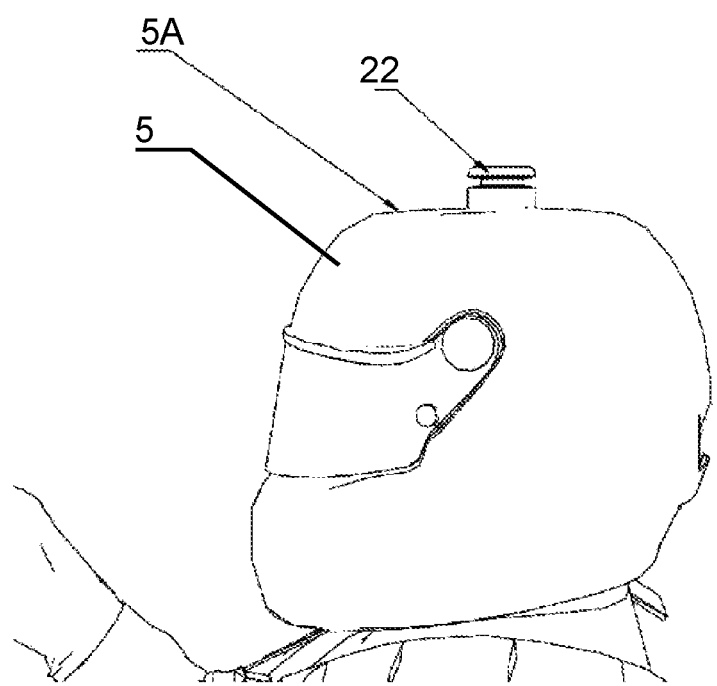
FIG. 36 shows an embodiment of a helmet with a flat top.

FIG. 36 shows an embodiment of a helmet 5 having a flattened top portion 5A, which allows locating the helmet pin 22 and consequently the arm 1 lower (even over 20 mm) than at typical rounded helmets, thereby lowering the mass center of the whole system.

Figure 37A:
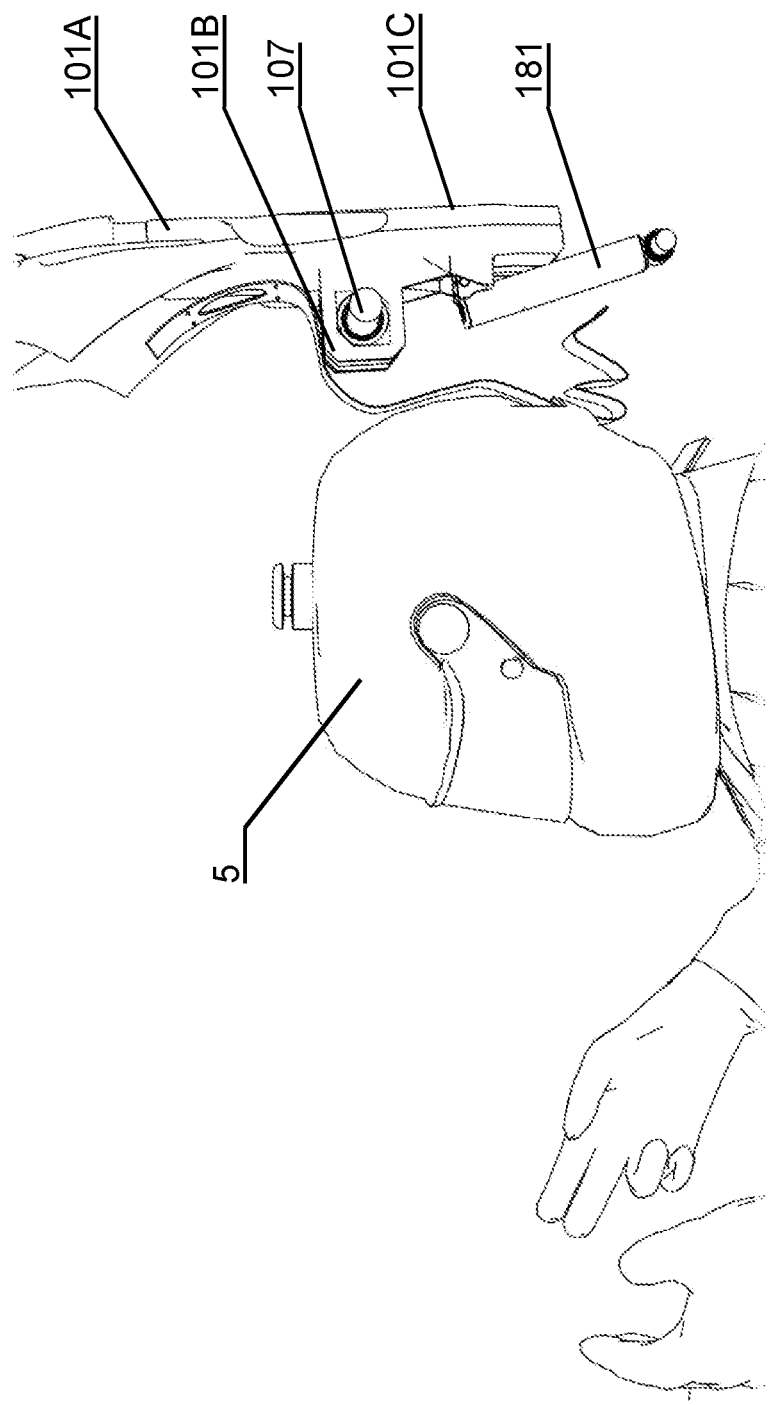
FIG. 37A shows an assembled view of another embodiment of the head and neck support device.
Figure 37B:
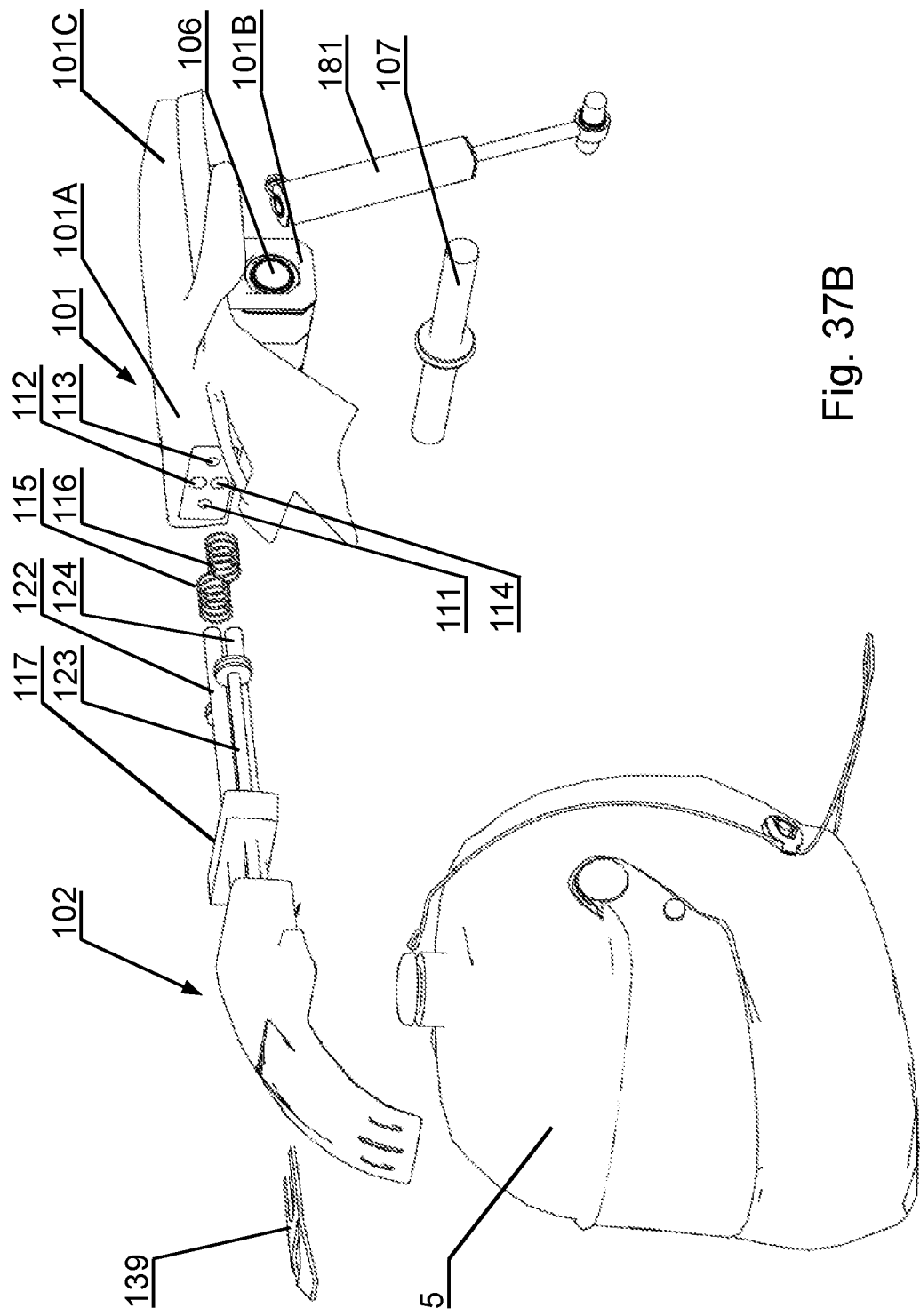
FIG. 37B shows an exploded view of the embodiment of FIG. 37A in a view from the top.
Figure 37C:
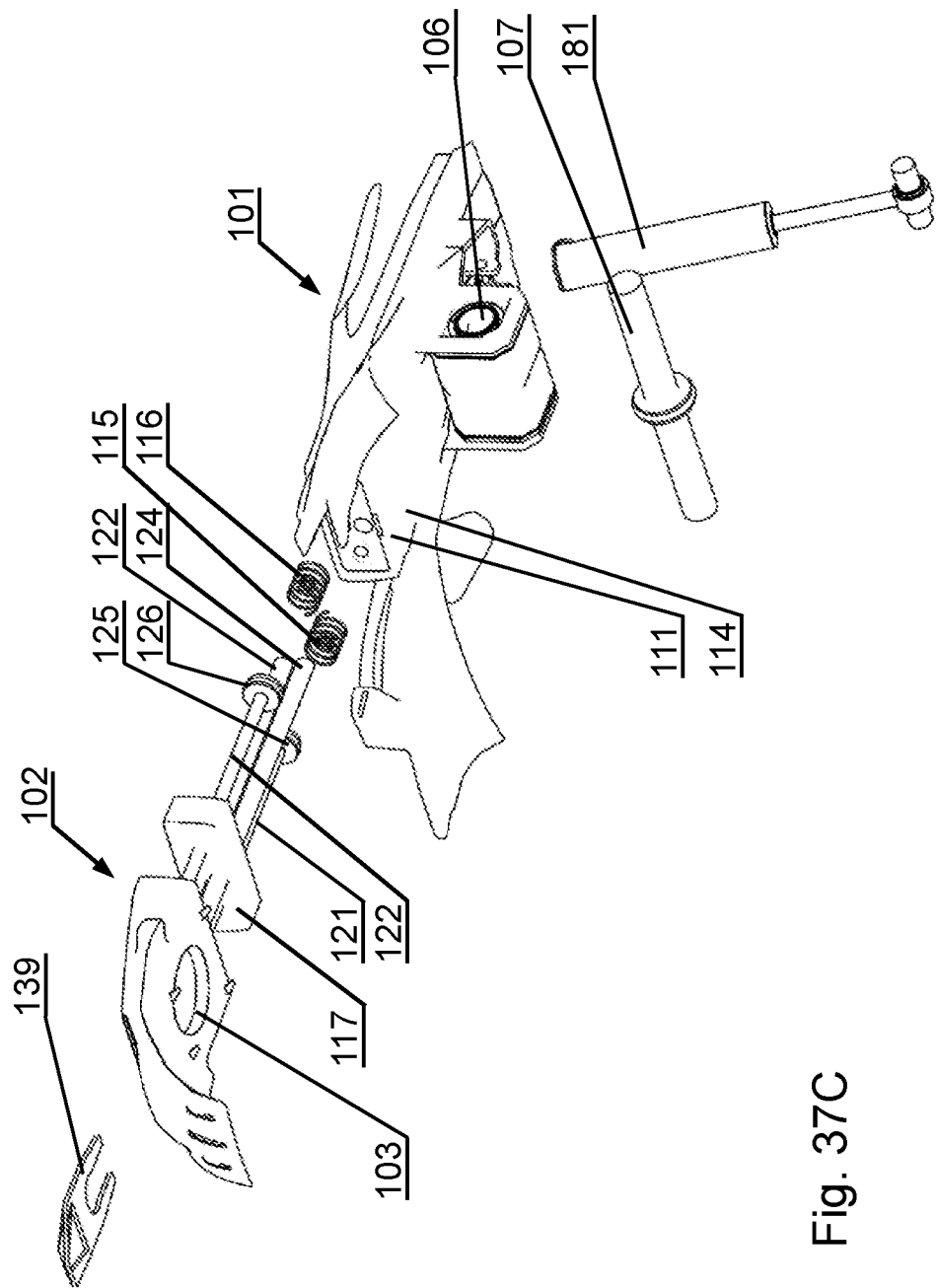
FIG. 37C shows an exploded view of the embodiment of FIG. 37A in a view from the bottom.
Figure 37D:
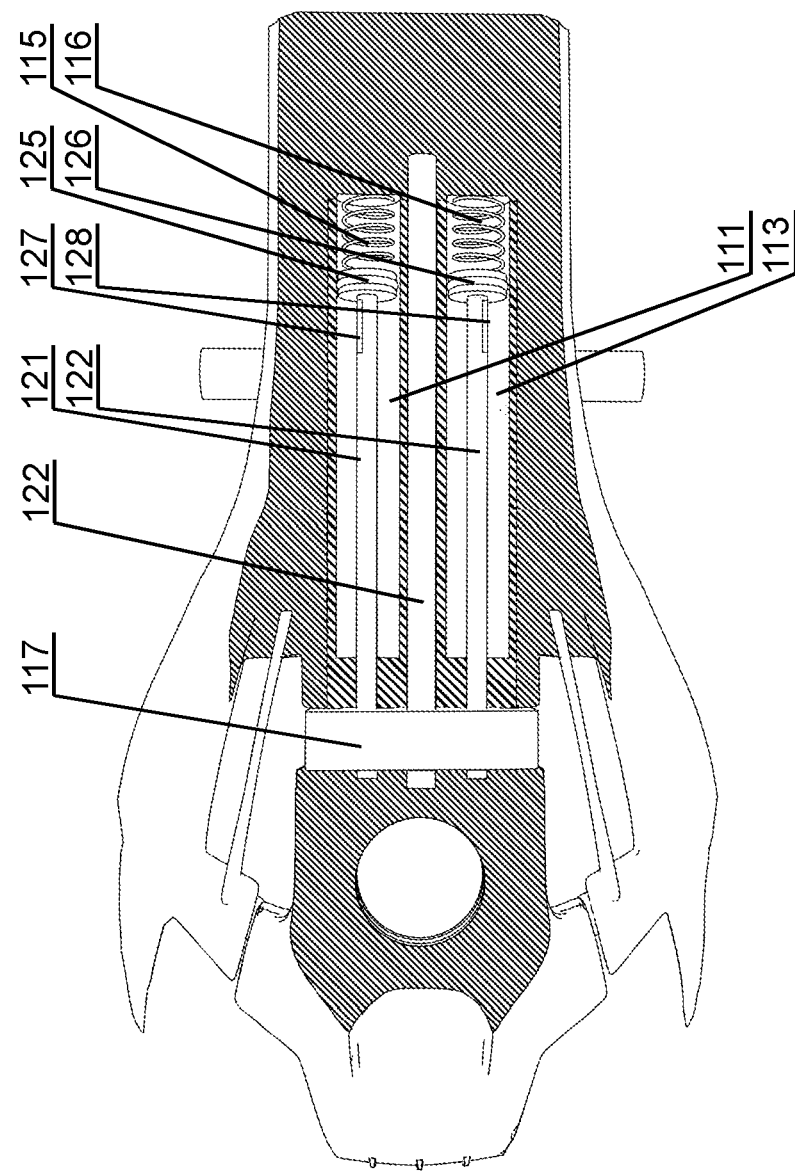
FIG. 37D shows a cross-section of the arm.

FIGS. 37A, 37B, 37C show another embodiment of the head and neck support device in an assembled view, an exploded view from the top and bottom, respectively. FIG. 37D shows a cross-section of the arm.

The arm 101 may be T-shaped, i.e. it may comprise three portions 101A, 101B, 101C forming the legs of the letter T. It has a first portion 101A to which a slidably-mounted element 102 is connected, a second portion 101B to be fixed to a carrying shaft 107 and a third portion 101C that rests on a resistance block 4 (that absorbs the energy of the impact, e.g. of a wheel to the helmet).

The actuator 181, connected to the third portion 101C of the arm 101, is used to effect lifting the arm 101 to an open position (as shown in FIG. 37A) to enable the driver entering and exiting the vehicle, by rotating the arm 101 around the pivot point defined by the carrying shaft 107. The carrying shaft 107 and the actuator 181 are fixed to the vehicle chassis. The actuator 181 is also used to neutralize the weight of the driver's head, the helmet and the overall system weight to limit their load acting on the driver's neck.

Inside arm 101, along its first portion 101A and third portion 101C, there are longitudinal openings 111, 112, 113, 114.

The openings 112, 114 are to accommodate longitudinal shafts 122, 124 that act as guiding rails for a slidably-mounted element 102. Alternatively, a single guiding opening and a single guiding rail may be used. The longitudinal shafts 122, 124 also provide protective function when, during extension of the slidably-mounted element 102, something hits the helmet—in that case the impact force is absorbed by the longitudinal shafts 122, 124 (in addition to the piston rods 121, 123).

The openings 111, 113 function as cylinders of an actuator, in which a piston rod 121, 123 terminated with a piston 125, 126 is movable. Such actuators limit the movement of the driver's head along the longitudinal axis of the arm 101, i.e. the longitudinal axis of the vehicle between the vehicle front and back.

The openings 111, 113 may have springs 115, 116 mounted in their end portions to dampen the movement of the pistons 125, 126 towards the back of the vehicle. The springs 115, 116, along with the absorbing element 117, dampen the movement of the slidably-mounted element 102 during the backward movement and during a hit from the front side to the helmet (e.g. by a wheel), or when the vehicle is hit at the back by another vehicle.

The piston rods 121, 123 may have transverse through openings 127, 128 positioned in front of the pistons 125, 126 to release the high pressure formed during forward movement of the pistons 125, 126.

An absorbing element 117 (having through-holes through which the rods 121-124 may move) is fixed to the end of the first portion 101A.

In case of an impact when moving forwards, the slidably-mounted element 102 moves forwards such that positive pressure forms in the cylinders 111, 113 between the pistons 125, 126 and the front portion of the cylinders 111, 113 and negative pressure increases between the pistons 125, 126 and the back portion of the cylinders 111, 113. This dampens the forward movement of the driver's head in the helmet 5 secured via the helmet pin 22 to the helmet clip 103 via a spring clip 139 until the pistons 125, 126 hit the front portion of the cylinders 111, 113. The high positive pressure may be then at least partially released via the through openings 127, 128. Next, the head returns under the force of the negative pressure formed at the back of the pistons 125, 126 and the pistons 125, 126 move towards the ends of the cylinders 121, 123 and are dampened by the springs 115, 116. This significantly reduces the forces acting on the driver's head in the front and back direction. The actuators may be configured to have, in a resting position, a neutral pressure at the back of the pistons 125, 126 (i.e. between the pistons 125, 126 and the springs 115, 116) which lowers to a negative pressure during frontal movement of the pistons 125, 126. Furthermore, for sports where high G forces act on the driver (such as Formula 1) and higher attenuation is desired, the actuators may have in the resting position, a negative pressure formed at the back of the cylinders 125, 126. In addition, the actuators may be configured to have, in the resting position, a positive pressure formed at the front of the cylinders 125, 126, such as to limit the movement for low G forces and effect the movement only upon accident. The overpressure and underpressure at the front and back of the cylinders 125, 126, respectively, may be formed by gas nozzles located at the front and back of the cylinders 125, 126 (not shown for clarity of drawing).

Figure 38A:
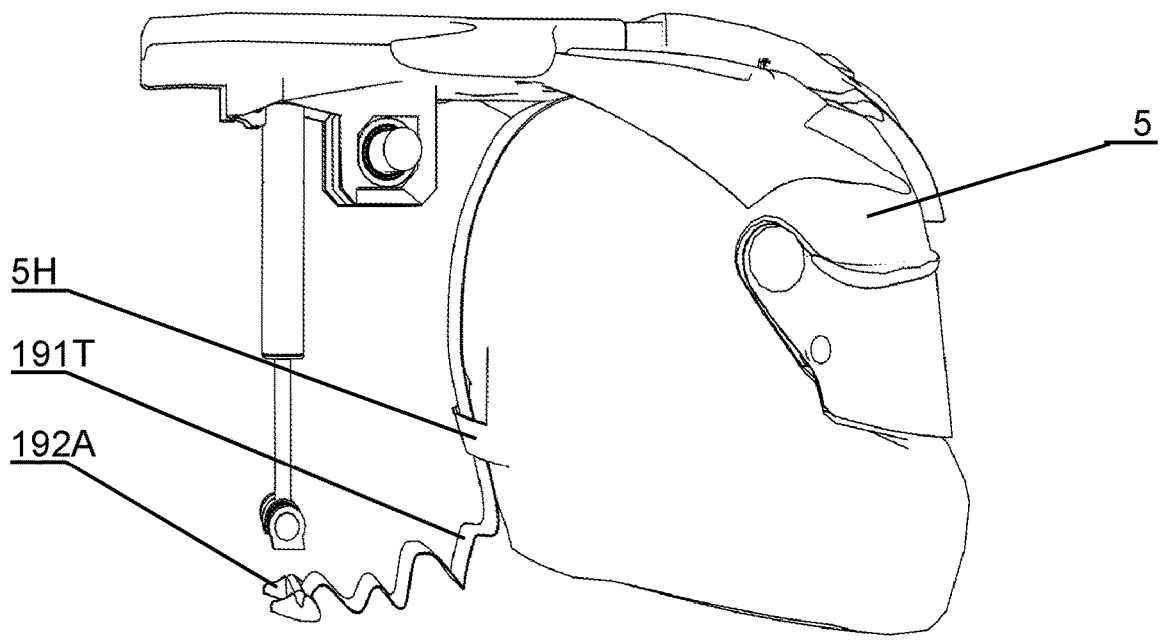
FIG. 38A shows an embodiment of mounting a head supporting tape or rope to the vehicle chassis.
Figure 38B:
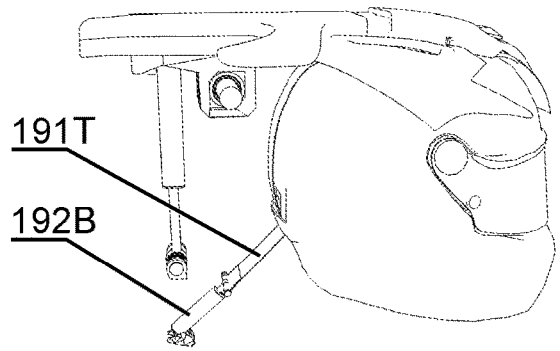
FIG. 38B shows another embodiment of mounting a head supporting tape or rope to the vehicle chassis.
Figure 38C:
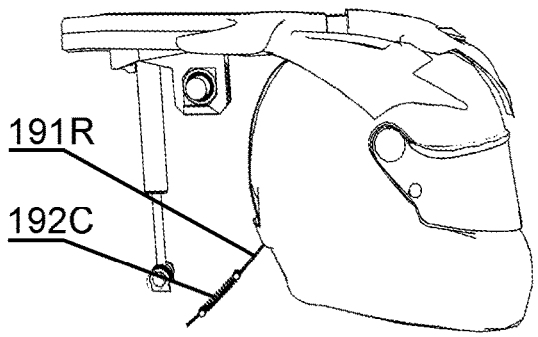
FIG. 38C shows another embodiment of mounting a head supporting tape or rope to the vehicle chassis.
Figure 38D:
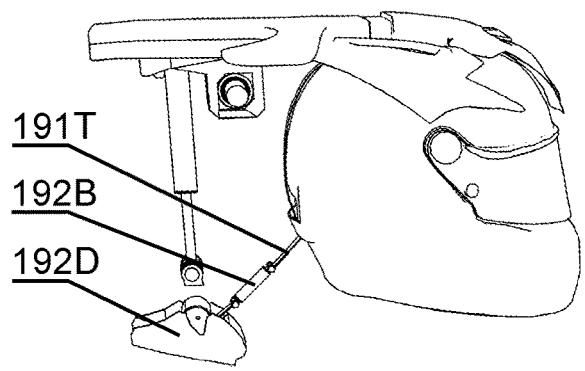
FIG. 38D shows another embodiment of mounting a head supporting tape or rope to the vehicle chassis.
Figure 38E:
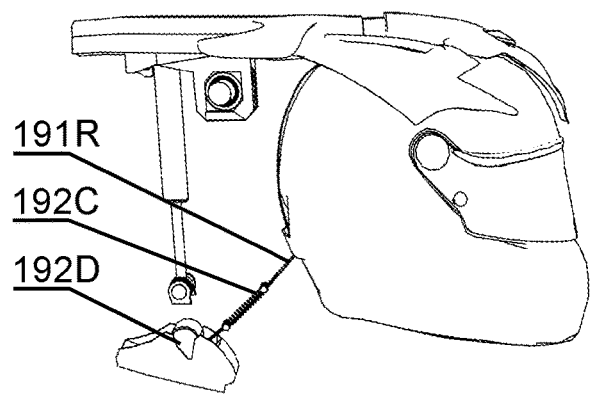
FIG. 38E shows another embodiment of mounting a head supporting tape or rope to the vehicle chassis.
Figure 38F:
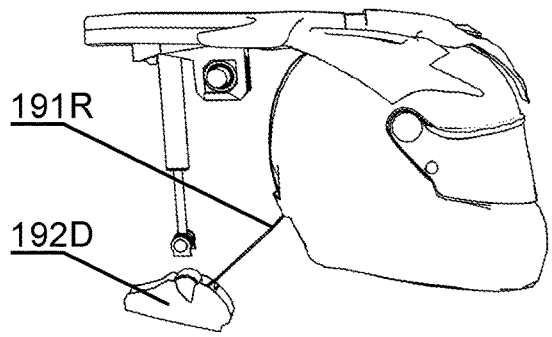
FIG. 38F shows another embodiment of mounting a head supporting tape or rope to the vehicle chassis.
Figure 38G:
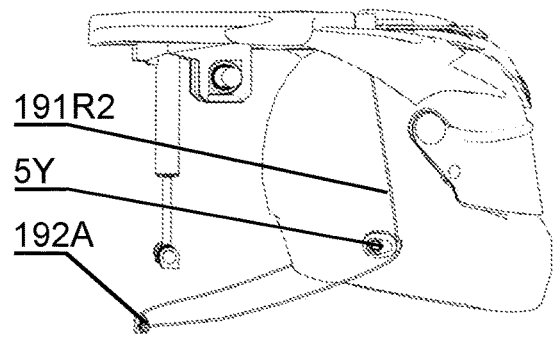
FIG. 38G shows another embodiment of mounting a head supporting tape or rope to the vehicle chassis.
Figure 38H:
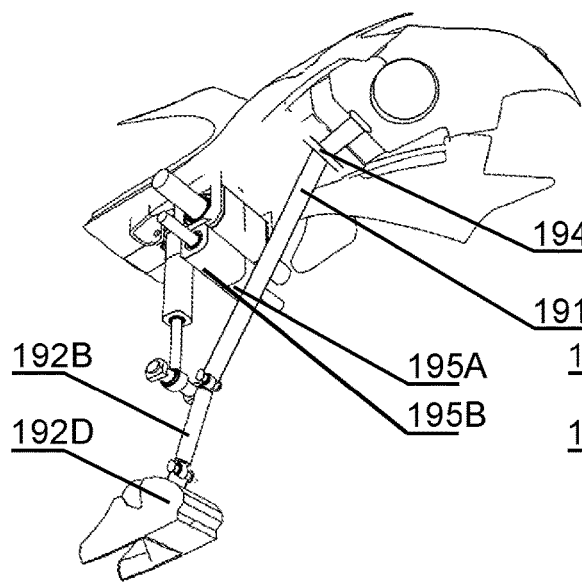
FIG. 38H shows another embodiment of mounting a head supporting tape or rope to the vehicle chassis.
Figure 38I:
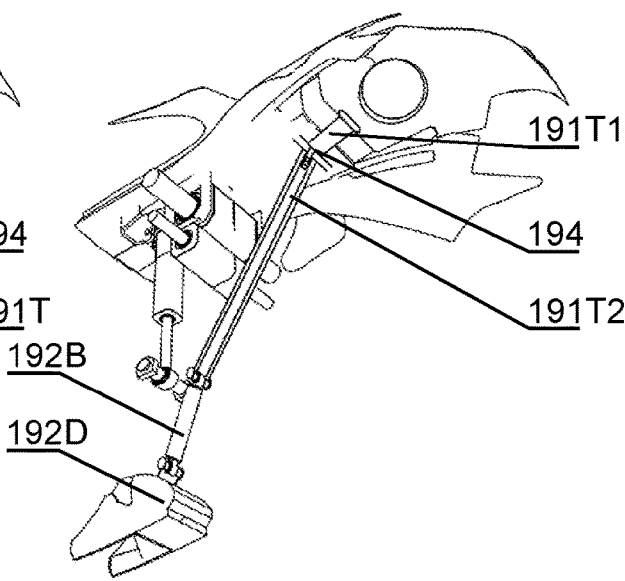
FIG. 38I shows another embodiment of mounting a head supporting tape or rope to the vehicle chassis.

In addition, the head and neck supporting system may comprise a head supporting tape or rope, which is mounted at one end to a vehicle chassis (as shown in various embodiments on FIGS. 38A-38I) and at the other end to the slidably-mounted element of the arm of any of the previous embodiments (as shown in various embodiments on FIGS. 39A-39D), wherein the tape or rope may pass through a holder at the helmet at a position in the lower half of the helmet or it may be secured at the sides of the helmet, such as to bias the head downwards when the slidably-mounted element moves forward, or it may pass directly without being attached to the helmet (as in FIG. 38H). Alternatively, the tape or rope may pass from the lower portion of the arm 101 (not from the slidably-mounted element) or from the slidably-mounted element and the lower side of the arm (as shown in FIG. 38I).

In case of accident, the tape or rope moves along with the slidably-mounted element and therefore it induces rotation of the driver's head in the helmet that is in accordance with the movement of the driver's body. This limits the forces acting on the driver's neck and therefore reduces the injury to the neck.

Figure 40:
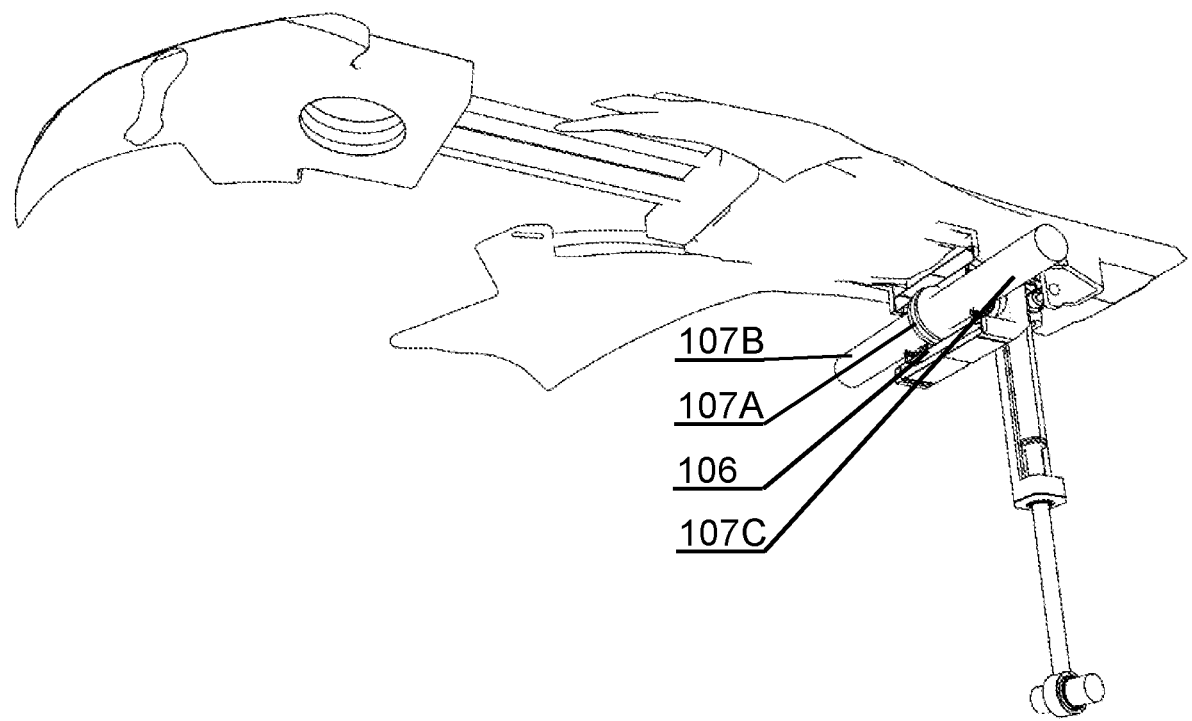
FIG. 40 shows an sideward limiting actuator for limiting the movement of the head sideways.

The movement of the driver's head sidewards may be limited, as shown in FIG. 40, by a sidewards limiting actuator formed by the mounting element 106 and the shaft 107, wherein the mounting element 106 forms a cylinder and the shaft 107 has a centrally mounted piston 107A and its side arms 107B, 107C form piston rods. The side arms 107B, 107C are connected to the vehicle chassis. The movement of the piston 107A within the cylinder is therefore dampened by overpressures and undepressures formed at sideward movement. In addition, the actuator may be configured to have, in the resting position, a positive pressure formed of the cylinder, such as to limit the movement for low G forces and effect the movement only upon accident. The overpressure or underpressure, respectively, may be formed by gas nozzles located on the cylinder (not shown for clarity of drawing).

Therefore, the system according to the invention limits the movement of the head sideways and allows rotation of the head sideways and in the driving direction.

Some embodiments shown below will be shown for a tape and some others for a rope for sake of example, wherein the rope can be exchanged with the tape and vice versa at least for some of the embodiments.

Figure 39A:
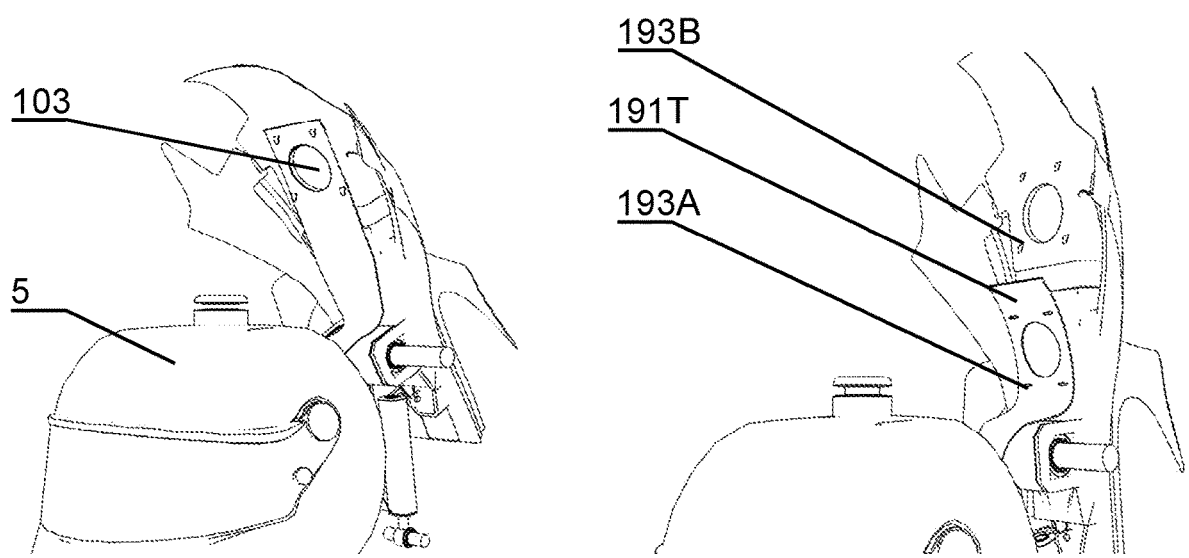
FIG. 39A shows an embodiment of mounting a head supporting tape to the arm.

In FIG. 38A there is shown an embodiment of a tape 191T that is connected at a helmet holder 5H located at the back of the helmet 5. One end of the tape is held by a chassis holder 192A that is attached to the vehicle chassis. In FIG. 39A the tape is shown in loose configuration.

In FIG. 38B, the tape 191T is attached to an actuator 192B that is attached to the vehicle chassis. The tape 191T passes through a holder 194 located under the arm (which can be applied also for other embodiments in FIGS. 38A-38I and 39A-39D).

In FIG. 38C, a rope 191R is attached to a spring 192C that is attached to the vehicle chassis.

In FIG. 38D, the tape 191T is attached to the actuator 192B, which is attached to a pretensioner 192D (which is attached to the vehicle chassis) that holds the tape 191T in a slightly tensioned configuration. During a crash, the tape 191T is quickly tightened. During normal driving, or during the process of exiting the vehicle, the pretensioner 192D allows extension of the tape 191T.

In FIG. 38E, the rope 191R is attached to the spring 192C, which is attached to the pretensioner 192D (which is attached to the vehicle chassis) that holds the tension of the rope 191R.

In FIG. 38F, the rope 191R is attached directly to the pretensioner 192D (which is attached to the vehicle chassis).

In FIG. 38G, a pair of ropes 191 R2 extends at both sides of the helmet 5 and passes via yokes 5Y and is attached to the holder 192A attached to the vehicle chassis.

In FIG. 38H, an embodiment is shown wherein a tape 191T is guided from the slidably-mounted element 102, under the arm 101, to the vehicle chassis (e.g. via an actuator 192B and a pretensioner 192D). A rope 191R may be used instead of the tape 191T and the ends of the tape or rope may be attached also to the vehicle chassis by other means 192A, 192C, such as shown in the embodiments of FIGS. 38B-38F.

In FIG. 38I, an embodiment is shown with two tapes: a first tape 191T1 is guided from the slidably-mounted element 102, via a holder 194 at the bottom of the arm, to an actuator 192B and a pretensioner 192D connected to the vehicle chassis. A second tape 191T2 is guided from the holder 194 to the actuator 192B and the pretensioner 192D connected to the vehicle chassis. The support 194 prevents the tapes from rubbing against the helmet.

The helmet holder 5H or holder 194 shall be positioned above the point at which the end of the tape or rope is connected to the vehicle chassis.

As shown in FIGS. 38H, 38I, the device may further comprise an additional cylinder having piston rods 195A, 195B extending from it sidewards and slightly shorter than the ends of the piston rods 107B, 107C, such that when the device is moved, these rods 195A, 195B hit the sides of the chassis, thereby enhancing the action of the piston rods 107B, 107C for limiting the movement of the structure sidewards. Alternatively, two separate cylinders can be used.

FIG. 39A shows an embodiment of mounting the head supporting tape to the arm, in an attached and detached configuration. The tape 191T has mounting holes 193A via which it is secured to mounting hooks 193B near the helmet clip 103.

Figure 39B:
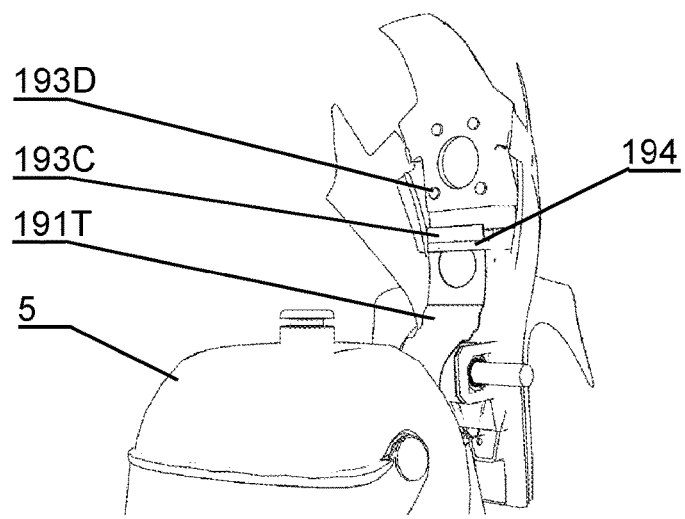
FIG. 39B shows another embodiment of mounting a head supporting tape to the arm.
Figure 39C:
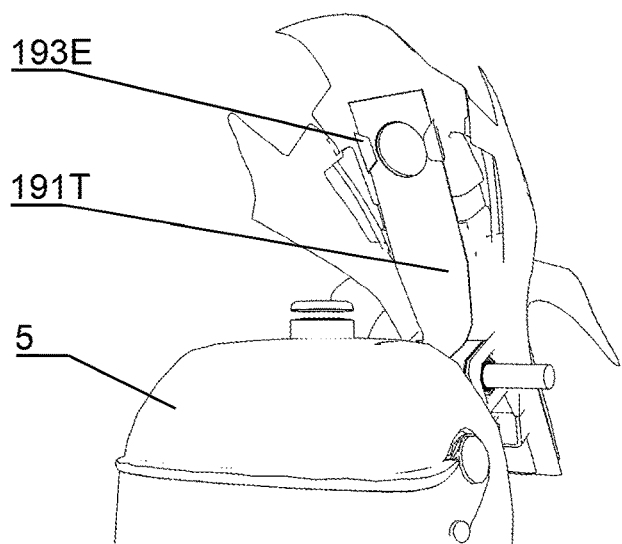
FIG. 39C shows another embodiment of mounting a head supporting tape to the arm.

FIG. 39B shows an embodiment of mounting the head supporting tape 191T having a metal or metalized end portion 193C to magnets 193D near the helmet clip 103. The tape is guided via a holder 194 under the arm 101 such as to avoid contact between the tape and the helmet. Such holder 194 can be used in a similar manner in the other embodiments as well. FIG. 39C shows an embodiment of mounting the head supporting tape 191T to guides 193E near the helmet clip 103.

Figure 39D:
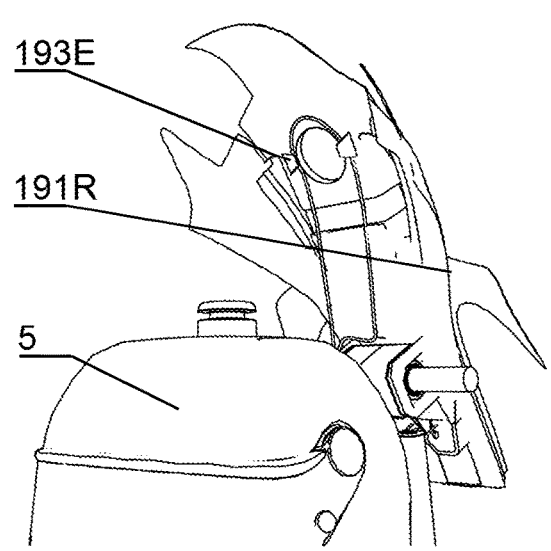
FIG. 39D shows an embodiment of mounting a head supporting rope to the arm.

FIG. 39D shows an embodiment of mounting the head supporting rope 191R to guides 193E near the helmet clip 103.

The elements shown are configured such that when the driver enters the vehicle, the head supporting tape or rope is mounted to the arm 101 by the support personnel. When the driver exists the vehicle, in particular just after an accident, the elements are easily detachable and do not hamper the exit procedure—they either slide out easily or can be easily detached by the driver.

The system according to the present invention serves as protection from impacts into the helmet, limits head movements (e.g. in case of taking sharp turns with relatively high g values) as well as protects in case of impacts of the vehicle into for example a safety fence. Therefore, the invention provides a useful, concrete and tangible result.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A head and neck support and protection device, comprising:
   an arm being pivotably mounted, at a first end, to a support and comprising, at a second end, a slidably-mounted element connected to a helmet clip;
   wherein the helmet clip is configured to engage a helmet pin;
   a resistance block configured to transfer energy into a vehicle chassis when the arm hits the resistance block;
   wherein the slidably-mounted element is configured to slide out of the arm, in a manner controlled by a restraint element, when conditions indicating a crash have been met.

2. The head and neck support and protection device according to claim 1, further comprising a protective pin positioned in the arm and in the slidably-mounted element and configured to be cut by a force acting on the slidably-mounted element during a crash.

3. The head and neck support and protection device according to claim 1, wherein the arm comprises an internal braking element configured to brake sliding of the slidably-mounted element out of the arm, wherein the braking element is mounted with a first end to the arm and with the other end to the slidably-mounted element.

4. The head and neck support and protection device according to claim 1, wherein the helmet clip comprises a head having a rotation limiter of the helmet pin having a delimiting protrusion located at the top.

5. The head and neck support and protection device according to claim 4, wherein the helmet clip allows for connecting the helmet pin using a hollow portion extending throughout its height, wherein the head further comprises a helical spring, mounted on the head, blocking balls to be received in cavities in the head, while the helmet pin comprises a circumferential groove for receiving the blocking balls, and a clamp ring comprising a grip of the clamp ring configured to block the helmet pin and the head in the helmet clip.

6. The head and neck support and protection device according to claim 1, wherein the resistance block is fixed to the vehicle chassis or a shell surrounding a driver's helmet whereas the shell is fixed to the vehicle chassis, or wherein the resistance block forms a part of the vehicle chassis.

7. The head and neck support and protection device according to claim 1 wherein the support is a carrying shaft positioned perpendicularly to a longitudinal axis of the arm and fixed to the vehicle chassis.

8. The head and neck support and protection device according to claim 7, wherein the carrying shaft comprises, at its ends, threaded openings, in which there are positioned first ends of threaded mandrels, wherein second ends of the threaded mandrels are mounted to threaded elements fixedly mounted to the vehicle chassis.

9. The head and neck support and protection device according to claim 7, wherein on the carrying shaft, between each of the threaded mandrels and the arm, there are energy absorbing elements.

10. The head and neck support and protection device according to claim 6, wherein the arm is positioned in a middle of the carrying shaft.

11. The head and neck support and protection device according to claim 1 wherein between engaging surfaces of the arm and the slidably-mounted element there is a friction reducing agent.

12. The head and neck support and protection device according to claim 1 wherein the arm has an attached element configured to compensate a weight of the device and a driver's helmet.

13. The head and neck support and protection device according to claim 12, wherein the attached element is at least one element selected from a group comprising: a spring, a counterweight, an actuator or a magnet.

14. The head and neck support and protection device according to claim 1 wherein the helmet clip comprises, within its hollow space, a head having a rotation limiter of the helmet pin, a helical spring positioned around the vertical portion of the head, blocking balls positioned in grooves of the head, whereas the helmet pin comprises a circumferential groove for receiving the blocking balls, and a clamp ring, wherein an opening, present in the top section of the helmet clip, is configured to receive a covering shield having an opening.

15. The head and neck support and protection device according to claim 1 wherein a connection between slidably-mounted element and the helmet clip is configured to facilitate a nodding movement or that a connection between the helmet clip and the helmet pin is configured to facilitate a nodding movement.

16. The head and neck support and protection device according to claim 1, wherein the helmet has a flattened top portion.

17. The head and neck support and protection device according to claim 1, further comprising a head support tape or rope attached at one end to the vehicle chassis and at the other end to the slidably-mounted element of the arm.

18. The head and neck support and protection device according to claim 17, wherein the head support tape or rope is attached in its middle portion to the helmet.

19. The head and neck support and protection device according to claim 18, wherein the head support tape or rope is attached to a holder at the back of the helmet.

20. The head and neck support and protection device according to claim 18, wherein the head support tape or rope is attached to yokes at the sides of the helmet.

21. The head and neck support and protection device according to claim 17, wherein the head support tape or rope is attached to the vehicle chassis via at least one of: a holder, an actuator, a pretensioner, a spring.

22. The head and neck support and protection device according to claim 1, further comprising a sidewards limiting actuator formed by a cylinder formed within the arm and a piston movable horizontally within the cylinder, the piston having two opposite piston rods connected to the vehicle chassis.

23. The head and neck support and protection device according to claim 1, further comprising a head support tape or rope attached at one end to the vehicle chassis and at the other end to the arm.

* * * * *